United States Patent
Akiyama

(10) Patent No.: US 7,564,756 B2
(45) Date of Patent: Jul. 21, 2009

(54) REPRODUCTION DEVICE AND METHOD WHEREIN DETECTION OF SUB-DATA GENERATED WITHIN A CONTROLLED TIME PERIOD CONTROLS APPROPRIATE DECRYPTION

(75) Inventor: Jun Akiyama, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 632 days.

(21) Appl. No.: 10/938,146

(22) Filed: Sep. 10, 2004

(65) Prior Publication Data
US 2005/0063265 A1   Mar. 24, 2005

(30) Foreign Application Priority Data
Sep. 11, 2003 (JP) ............... 2003-320421
Sep. 6, 2004 (JP) ............... 2004-258746

(51) Int. Cl.
G11B 7/00 (2006.01)
(52) U.S. Cl. ................... 369/53.31; 369/53.35
(58) Field of Classification Search ............ 369/53.31, 369/53.35, 59.21; G11B 7/00, 5/09
See application file for complete search history.

(56) References Cited

U.S. PATENT DOCUMENTS

| | | | | |
|---|---|---|---|---|
| 6,061,319 | A * | 5/2000 | Fujiki | 369/59.21 |
| 6,157,606 | A * | 12/2000 | Inazawa et al. | 369/116 |
| 6,335,912 | B1 * | 1/2002 | Kobayashi et al. | 369/59.1 |
| 6,665,240 | B1 * | 12/2003 | Kobayashi et al. | 369/47.15 |
| 6,775,215 | B2 * | 8/2004 | Kobayashi et al. | 369/53.21 |
| 6,963,529 | B1 * | 11/2005 | Kobayashi et al. | 369/59.24 |
| 7,020,057 | B2 * | 3/2006 | Kobayashi et al. | 369/47.19 |
| 2003/0140297 | A1 | 7/2003 | Itakura | |
| 2004/0001414 | A1 * | 1/2004 | Kadowaki et al. | 369/59.24 |
| 2005/0163002 | A1 | 7/2005 | Kobayashi et al. | |
| 2005/0169134 | A1 | 8/2005 | Kobayashi et al. | |
| 2005/0174915 | A1 | 8/2005 | Nagai et al. | |
| 2006/0083143 | A1 | 4/2006 | Kobayashi et al. | |
| 2006/0092823 | A1 | 5/2006 | Kobayashi et al. | |
| 2006/0114773 | A1 | 6/2006 | Kobayashi et al. | |
| 2006/0221784 | A1 | 10/2006 | Kobayashi et al. | |
| 2006/0221793 | A1 | 10/2006 | Kobayashi et al. | |

(Continued)

FOREIGN PATENT DOCUMENTS

JP     2000-195049     7/2000

(Continued)

Primary Examiner—Wayne R Young
Assistant Examiner—Lixi Chow
(74) Attorney, Agent, or Firm—Edwards Angell Palmer & Dodge LLP; David G. Conlin; David A. Tucker

(57) ABSTRACT

A reproducing device includes a detection circuit and an integration circuit. The detection circuit detects a push-pull signal PP. The integration circuit carries out integration processing with respect to one or greater frames of the push-pull signal, and carries out binarization processing with respect to integration results thus obtained, thereby detecting sub data. In the integration circuit, the more the frames to be used for detecting sub data is, the higher the accuracy of the detected sub data is. The reproducing device further includes a control circuit for controlling the total number of the frames to be used for generating valid sub data in the integration circuit. The control circuit controls the total number of the frames in accordance with a result of an error correction made by an error correction circuit.

9 Claims, 13 Drawing Sheets

U.S. PATENT DOCUMENTS

| | | |
|---|---|---|
| 2006/0239163 A1 | 10/2006 | Kobayashi et al. |
| 2006/0239164 A1 | 10/2006 | Kobayashi et al. |
| 2006/0239165 A1 | 10/2006 | Kobayashi et al. |
| 2006/0245329 A1 | 11/2006 | Kobayashi et al. |
| 2007/0165508 A1 | 7/2007 | Kobayashi et al. |
| 2007/0171801 A1 | 7/2007 | Kobayashi et al. |
| 2007/0211597 A1 | 9/2007 | Kobayashi et al. |

FOREIGN PATENT DOCUMENTS

| | | |
|---|---|---|
| JP | 2002-203374 | 7/2002 |
| JP | 2003-223764 | 8/2003 |
| WO | WO-02/35529 A2 | 5/2002 |

\* cited by examiner

US 7,564,756 B2

REPRODUCTION DEVICE AND METHOD WHEREIN DETECTION OF SUB-DATA GENERATED WITHIN A CONTROLLED TIME PERIOD CONTROLS APPROPRIATE DECRYPTION

This Nonprovisional application claims priority under 35 U.S.C. § 119(a) on Patent Application No. 2003/320421 filed in Japan on Sep. 11, 2003, and Patent Application No. 2004/258746 filed in Japan on Sep. 6, 2004, the entire contents of which are hereby incorporated by reference.

FIELD OF THE INVENTION

The present invention relates to a data storage medium reproducing device and a method for reproducing a data storage medium, in which data stored in a data storage medium such as an optical disc is reproduced.

BACKGROUND OF THE INVENTION

In recent years, as various data such as image data and audio data are digitalized, amount of digital data is dramatically increased. Based on this, an optical disc drive suitable for realizing of high-capacity and high density has been developed.

Meanwhile, because copyright protection is carried out with respect to many image data and audio data, needed is a way how these copyright works are protected from being copied without authorization. In order to carry out the copyright protection, the techniques, in which sub data for copyright protection, such as encryption key, is recorded on an optical disc or the like, has been developed.

Among these techniques, for example, Japanese Laid-Open Patent Application Tokukai 2000-195049/2000 (published on Jul. 14, 2000; hereinafter referred to as "patent document 1"), and Japanese Laid-Open Patent Application Tokukai 2002-203374/2002 (published on Jul. 19, 2002; hereinafter, referred to as "patent document 2") disclose a technique in which superimposition of sub data is carried out in accordance with minute displacement of pits by which main data such as image data is recorded. Here, the technique disclosed in patent document 1 is described.

FIG. 12 shows how the pits are formed on an optical disc in accordance with the technique disclosed in patent document 1. The technique employs a pit length of each pit, and a distance between the pits to record encrypted audio data. Further, in the technique, each pit P is formed so that the minute displacement, toward outer or inner periphery of a track center TC in a radial direction, is provided for each pit P. The minute displacement allows encryption key data KY to be recorded for decrypting the encrypted audio data.

FIG. 13 shows a block diagram of an optical disc drive 130, in which a reproduction is carried out with respect to an optical disc on which the audio data and the encryption key data KY is thus recorded.

In the optical disc drive 130, a servo circuit 133 controls a spindle motor 132 so that an optical disc 131 is driven and rotated at a constant linear velocity.

Further, an optical head 134 irradiates a laser beam to the optical disc 131. Then, the optical head 134 receives the light reflected from the optical disc 131 via a predetermined light receiving device, and outputs a radio frequency signal RF whose signal level varies depending on the light intensity of the reflected light on a light receiving surface of the light receiving device. This allows the signal level of the radio frequency signal RF to vary in accordance with the pits recorded on the optical disc 131.

Further, the optical head 134 processes a reception result of the reflected light by using the push-pull method. This allows the optical head 134 to generate a push-pull signal PP, whose signal level varies in accordance with a location of a pit with respect to a location of an irradiated laser beam, in the radial direction of the optical disc 131. Further, the optical head 134 generates and outputs a focus error signal whose signal level varies in accordance with amount of focus error.

The servo circuit 133 band-limits the push-pull signal PP so as to generate a tracking error signal, whose signal level varies in accordance with de-track amount. The de-track amount indicates how far a location of irradiated laser beam is with respect to the track center. With the tracking error signal, the servo circuit 133 carries out a tracking control to the optical head 134. Further, the servo circuit 133 carries out a focus control with respect to the optical head 34 in accordance with the focus error signal.

A high-pass filter (HPF) 135 suppresses low-frequency components of the push-pull signal PP so as to remove the de-track amount component from the push-pull signal PP, whose signal level varies in accordance with a location of a pit with respect to a location of an irradiated laser beam, the de-track amount component being indicative of how far a location of irradiated laser beam is with respect to the track center. This allows the high-pass filter 135 to detect a displacement detection signal HPP, whose signal level varies in accordance with the location of the pit with respect to the track center.

The radio frequency signal RF is binarized by a binarization circuit 136, based on a predetermined reference signal level, so as to generate a binary signal BD.

A PLL circuit 137 operates in synchronization with the binary signal BD, so as to reproduce a channel clock CCK of the radio frequency signal RF.

The binary signal BD is sequentially latched by an EFM (Eight to Fourteen Modulation) decoder circuit 138 in synchronization with the channel clock CCK. This allows the EFM decoder circuit 138 to reproduce a reproduction data that corresponds to an EFM encoding signal S2. Further, the EFM decoder circuit 138 carries out an EFM decoding of the reproduction data, and then comparts the decoded data per 8 bits based on frame sync. Thereafter, the EFM decoder circuit 138 de-interleaves 8-bit signal thus comparted, and sends it to an ECC (Error Correction Code) circuit 139.

The ECC circuit 139 carries out an error correction with respect to data, sent from the EFM decoder circuit 138, in accordance with an error correction code which is added to such data. This allows the encrypted audio data to be reproduced and outputted.

The encrypted audio data is decrypted by a decryption circuit 140 with the use of an encryption key data KY, which has been detected by a key detection circuit 142, and then the audio data thus decrypted (audio data D1) is outputted from decryption circuit 140.

The decryption circuit 140 thus outputs the audio data D1 to a digital/analog (D/A) converter circuit 141, in which a digital/analog conversion is carried out with respect to the audio data D1, so that an analog audio signal S4 thus converted is outputted from the D/A converter circuit 141.

The key detection circuit 142 processes the displacement detection signal HPP, in accordance with the channel clock CCK and the binary signal BD, respectively, so as to reproduce the encryption key data KY. Then, the encryption key data KY thus reproduced is sent to the decryption circuit 140.

Here, the displacement detection signal HPP obtained from each of the pits has significantly a deteriorated SN (signal-to-noise) ratio because each displacement of the pits is minute.

In view of the circumstances, the key detection circuit 142 accumulates each frame of the displacement detection signals HPP corresponding to one frame so as to carry out binary discrimination. On this account, the discrimination allows the encryption key data KY to be reproduced because high SN ratio is maintained. Accordingly, the encryption key data KY, which is recorded on the optical disc 131 so as not to be found out, is securely reproduced.

In the technique of patent document 1, when the optical disc drive 130 reproduces the optical disc 131, the signal qualities of the push-pull signal PP and the displacement detection signal HPP change due to a disturbance such as an unfocussed optical head 134, and/or a tilt of the optical disc 131.

When the disturbance is large, the signal quality of the displacement detection signal HPP deteriorates. Accordingly, the accumulation processing should be carried out for a long time to obtain adequate SN ratio in the displacement detection signal HPP. On the other hand, when the disturbance is small, the signal quality of the shift detection signal HPP is good. Therefore, it is possible to obtain a displacement detection signal HPP while maintaining sufficient SN ratio, even if the accumulation processing is carried out for a relatively short time.

It should be appreciated that the encryption key data KY is essential for decryption of the encrypted audio data. Therefore, the encryption key data KY always needs to be accurately obtained.

On this account, in the technique of patent document 1, it appears that the accumulation processing is carried out for such a sufficient long time that corresponds to one frame, so as to obtain an accurate encryption key data KY even in a state of a possible worst signal quality during normal reproducing.

SUMMARY OF THE INVENTION

However, in cases where an accumulation processing is carried out for such a sufficient long time that corresponds to one frame, such an accumulation processing gives rise to a longer accumulation than necessary, even if the signal quality is good. It is preferable to carry out the accumulation for a period of time as short as possible. This is because there is a correlation between (i) the time taken for the accumulation processing and (ii) the time lag between an initiation of the reproducing processing and an actual output of sound or the like. Therefore, it is desirable to minimize the time for the accumulation processing to such a degree that obtains an accurate encryption key data KY.

For this purpose, it is essential to be able to adjust the accuracy of the detected data and the time taken for the processing. Further, it is preferable to be able to detect the data having a predetermined accuracy for a shorter time in accordance with the signal quality of the reproduction. The present invention provides a data storage medium reproducing device and a method for reproducing a data storage medium, each for achieving these objects.

Specifically, in order to solve the problems, a data storage medium reproducing device of the present invention for reproducing data recorded in a data storage medium includes: (1) signal detection means for reading out the data storage medium, and for detecting a reproduction signal, which is modulated in accordance with recorded data; (2) data detection means for (i) generating detection data, which is an obtained detection result of the recorded data, by using one or more specific parts in the reproduction signal, and (ii) allowing accuracy of the detection data to be higher one, as a total time length of the specific parts to be used for generating the detection data is longer; and (3) control means for controlling the total time length of the specific parts to be used, by the data detection means, for generating valid detection data.

The signal detection means reads out the data storage medium, and detects the reproduction signal, which is modulated in accordance with the data recorded on the data storage medium.

Further, the data detection means generates the detection data, which is the detection result of the recorded data, with the use of one or more specific parts in the reproduction signal. The term "specific parts" in the reproduction signal indicates temporal part in the time-series reproduction signal. The data detection means allows accuracy of the detection data to be higher one, as a total time length of the specific parts to be used for generating the detection data is longer.

As such, accurate detection data can be obtained when the total time length is long. However, when the total time length is long, it takes so long for the data detection means to finish the processing. This gives rise to the prolonging of the time from a starting of the reproducing processing to an outputting of the data which has actually been reproduced.

In view of the circumstances, the data storage medium reproducing device of the present invention is arranged so that the control means controls the total length of the specific parts to be used, by the data detection means, for generating valid detection data. The term "valid detection data" indicates detection data that is recognized and handled as valid in the subsequent processing which should be carried out based on the detection data. On this account, the accuracy of the detection data, and the processing time can be adjusted, respectively. Therefore, when the adjustment is suitably carried out, it is possible to shorten the processing time while securing the predetermined accuracy of the detection data.

A method of the present invention for reproducing a data storage medium, which stores recorded data includes the steps of: (a) reading out the data storage medium, and detecting a reproduction signal, which is modulated in accordance with recorded data; (b) generating detection data, which is an obtained detection result of the recorded data, by using one or more specific parts in the reproduction signal, and allowing accuracy of the detection data to be higher one, as a total time length of the specific parts to be used for generating the detection data becomes longer; and (c) controlling the total time length of the specific parts to be used, in the step (b), for generating valid detection data.

According to the method, by performing the step (a), the step (b), and the step (c) step, the same functions of the signal detection means, the data detection means, and the control means are realized, respectively. Therefore, the method of the present invention has the same effect as that of the data storage medium reproducing device of the present invention.

The data storage medium reproducing device and the method for reproducing a data storage medium reproducing device, in accordance with the present invention, are widely applicable to a device and a method for reproducing data recorded on a data storage medium, and applicable particularly to a device and a method for reproducing a data storage medium in which data is recorded in high density, and/or a data storage medium which requires highly reliable copyright protection.

Additional objects, features, and strengths of the present invention will be made clear by the description below. Further, the advantages of the present invention will be evident from the following explanation in reference to the drawings.

DESCRIPTION OF THE EMBODIMENTS

One embodiment of the present invention will be described below with reference to FIG. 1 to FIG. 11.

The following description discusses how data is recorded on or reproduced from an optical disc in accordance with minute displacements of pits on the optical disc with reference to FIG. 8 through FIG. 11. The optical disc is, for example, a CD, a DVD, a high-definition digital video disc, or the like, and is particularly an optical disc, adopting an encryption key, which can carry out copyright protection while securing high reliability.

Note that minute displacement of the pit may be made in a direction (tangential direction) along a track of the optical disc, or in a direction (radial direction) perpendicular to the track. The following description deals with a case of the minute displacement made in the radial direction.

An optical disc of the present embodiment includes a plurality of pits for storing data (information). The data includes main data and sub data. The main data is recorded in accordance with a pit length of each pit and a distance between the pits. The sub data is recorded in the form of the minute displacement of each pit, the minute displacement being formed with respect to the track center. It is assumed here that the main data is data such as encrypted audio data, encrypted image data, or the like, whereas the sub data is encryption key data for decrypting the main data. It is also assumed that the main data and the sub data are respectively encoded by an error correction code so that an error correction circuit can carry out an error correction with respect to the two kind of data.

Figure 8:
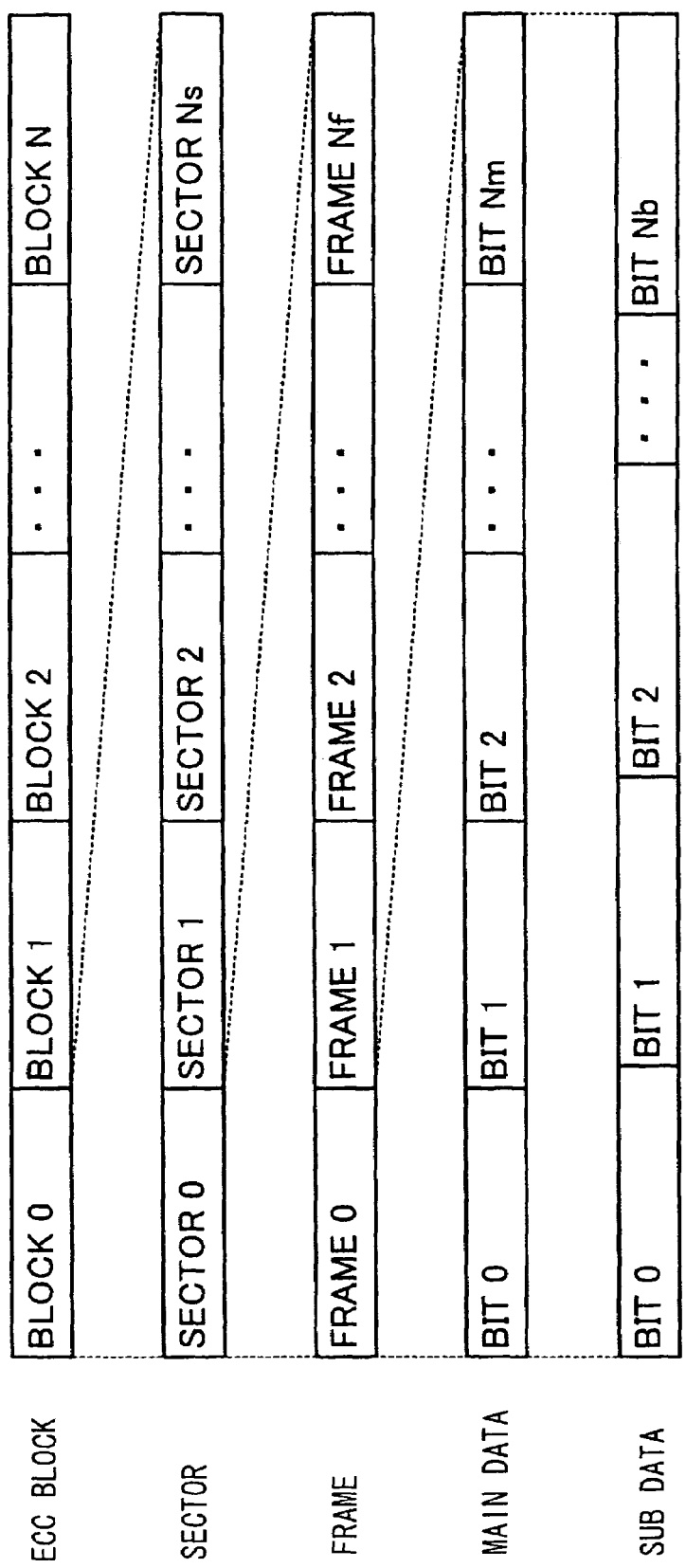
FIG. 8 illustrates a data format of an optical disc.

FIG. 8 illustrates data format of the optical disc. The main data of the optical disc is divided into (N+1) ECC (Error Correction Code) blocks, each of which is a unit for an error correction processing which is carried out with respect to the main data. Each of the ECC blocks is made up of (Ns+1) sectors. Each of the sectors is made up of (Nf+1) frames. Further, each of the frames is made up of (Nm+1) bits of the main data. The frame includes, for example, about several tens of thousand bits of the main data, however, the amount of the main data varies depending on storage density of the optical disc.

Meanwhile, the sub data is recorded so as to have lower storage density than that of the main data. Namely, on the optical disc, one bit of the sub data is recorded longer than one bit of the main data. One frame of the sub data is made up of (Nb+1) sub data bits. The (Nb+1) sub data bits constitute a unit for error correction of the sub data. Note that the sub data is detected for each one frame (specific part) or for every plural frames (specific parts). In this case, one frame is a unit of data for detecting the sub data. Note also that it is assumed that a frame length of one frame of the main data is identical to that of one frame of the sub data.

Data amount of the sub data varies depending on data amount of the encryption key data that is to be stored. The main data can be encrypted in accordance with a general encryption method such as the DES (Data Encryption Standard), the Triple DES, the AES (Advanced Encryption Standard), or the like. In the DES, the data amount of the encryption key is 56 bits. In the triple DES, the data amount is 168 bits. In the AES, the data amount is in a range of 128 bits to 256 bits. Further, for error correction, several tens of redundant bits are added to the data amount. This causes the sub data to have data amount of several tens of bits to several hundred bits.

For example, it is assumed that the data amount (Nm+1) of one frame of the main data is 8000 bits, and that the data amount (Nb+1) of one frame of the sub data is 80 bits. In this case, the main data is recorded so as to have hundredfold recording density compared with the recording density of the sub data. Therefore, on the optical disc, one bit of the sub data corresponds to 100 bits of the main data.

The following description is mainly focused on the sub data. Therefore, it is assumed that, when a term "frame" or "bit" is used without particularly specifying whose frame or bit it is, such a term is for the sub data.

The sub data is not recorded so that each constituent bit "0" or "1", directly corresponds to the minute displacement in the radial direction. Namely, the sub data is recorded after it is subjected to a modulation processing (encoding processing). If the sub data is recorded without the modulation processing, the following occurs, for example. When all the bits of the sub data are "0" or "1", all the pits are formed so as to have displacement toward only one side with respect to the track center. This causes the track center to be indefinite when reading out the optical disc. Accordingly, it becomes difficult to detect which side the pits are displaced toward. In order to prevent this problem, the sub data is recorded after the modulation processing.

Thus, the modulation processing should be carried out so that all the pits are not displaced toward only one side with respect to the track center. This means that a modulation is carried out so that a signal for recording the sub data does not have direct current component. Various kinds of modulations causing no direct current component are well known. Among them, for example, the FM (Frequency Modulation) method, the MFM (Modified frequency Modulation) method, the PE (Phase Encoding) method, the EFM (Eight to Fourteen Modulation) method, the (1, 7) RLL (Run Length Limited) method, the (2, 7) RLL method, or the like may be adopted.

Here, it is assumed that the sub data is recorded after it is subjected to the PE method, with which demodulation processing can be carried out with ease. In the PE method, a bit "0" of the sub data is replaced with two channel bits "10", and a bit "1" of the sub data is replaced with two channel bits "01". The channel bits "0" and "1" are recorded on an optical disc in the form of minute displacement from the track center in the radial direction. For example, the channel bit "0" corresponds to the pit displacement toward inner side of the optical disc, whereas the channel bit "1" corresponds to the pit displacement toward outer side of the optical disc.

Figure 9:
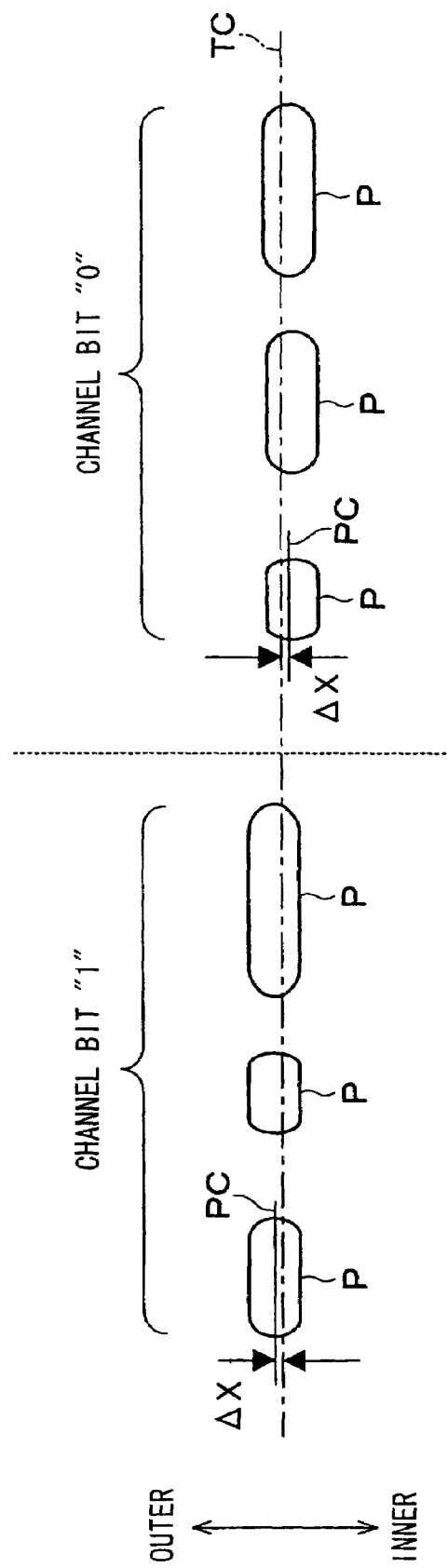
FIG. 9 is a plan view illustrating how pits on the optical disc are arranged.

FIG. 9 shows how the pits are arranged. Each channel bit is made up of a plurality of pits P. In FIG. 9, each of the pits P constituting the channel bit "1" has a pit center PC, and the pit center PC is displaced, by amount of $\Delta X$ toward the outer side (i.e., toward an upper side in FIG. 9), from the track center TC. On the other hand, each of the pits P constituting the channel bit "0" is displaced, by amount of $\Delta X$ toward the outer side (i.e., toward a lower side of FIG. 9), from the track center TC. The displacement amount of $\Delta X$ falls within such a sufficiently small range that no displacement can be recognized by using an ordinary microscope. For example, the displacement amount of $\Delta X$ falls within a range of 5 nm to 10 nm.

Figure 10:
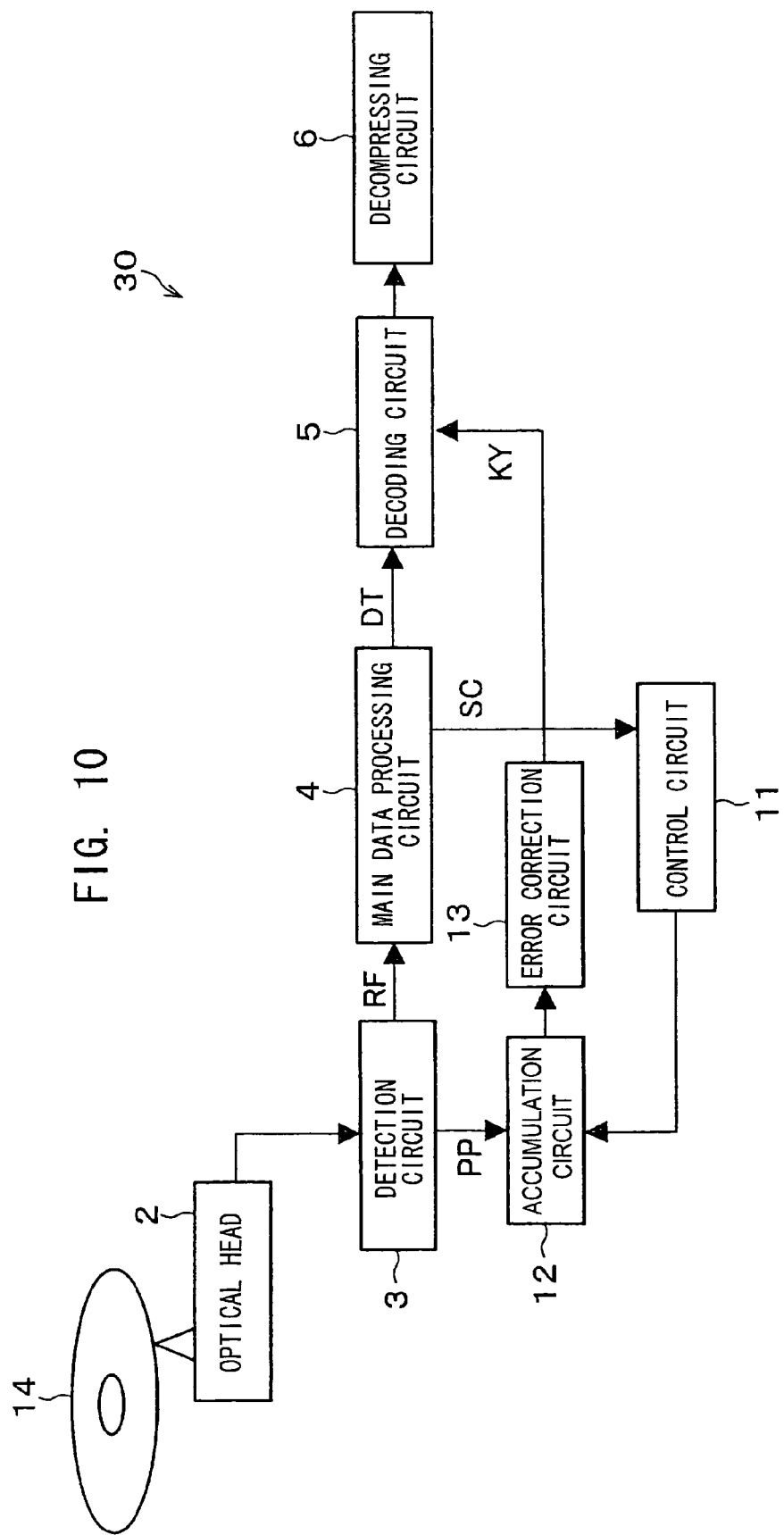
FIG. 10 is a block diagram illustrating a structure of a reproducing device on which the reproducing device of FIG. 1 is premised.
Figure 11:
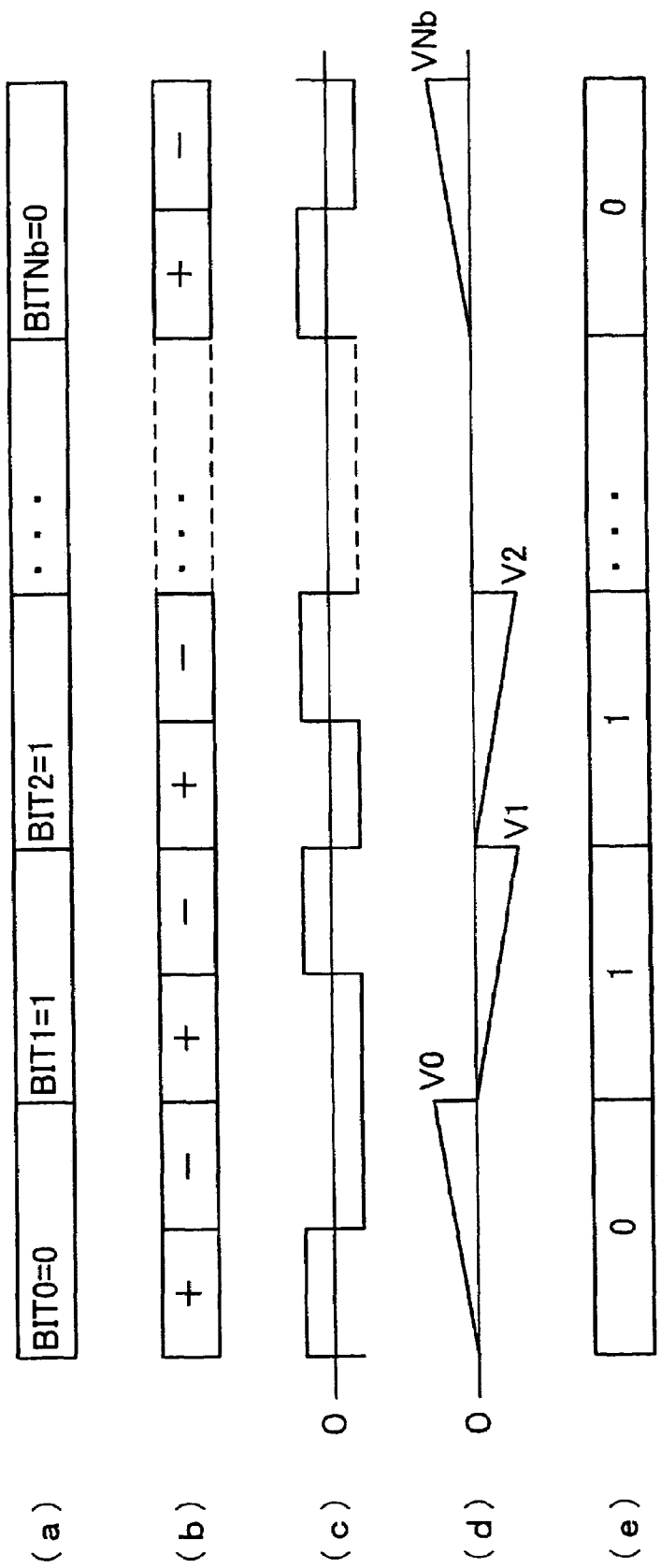
FIG. 11(a) is a timing chart illustrating a sequence of reproduction of the bits and the frames on the optical disc to be reproduced by the reproducing device shown in FIG. 10.
FIG. 11(b) is a timing chart illustrating a cyclic signal outputted from a control circuit outputs to the integration circuit in the reproducing device of FIG. 10.
FIG. 11(c) is a timing chart illustrating a push-pull signal that a detection circuit outputs to the integration circuit in the reproducing device of FIG. 10.
FIG. 11(d) is a timing chart illustrating an integration result of a push-pull signal shown in FIG. 11(c).
FIG. 11(e) is a timing chart illustrating binary data obtained by binarizing the integration result shown in FIG. 11(d).
FIG. 11(f) is a timing chart illustrating an error signal indicating whether an error is correctable or uncorrectable in accordance with the binary data shown in FIG. 11(e).
Figure 12:
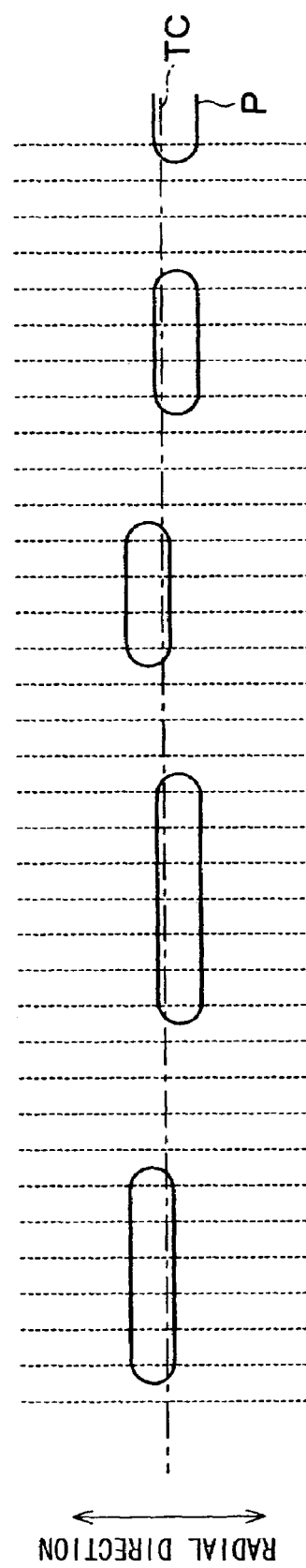
FIG. 12 is a plan view illustrating how pits of a conventional optical disc are arranged.
Figure 13:
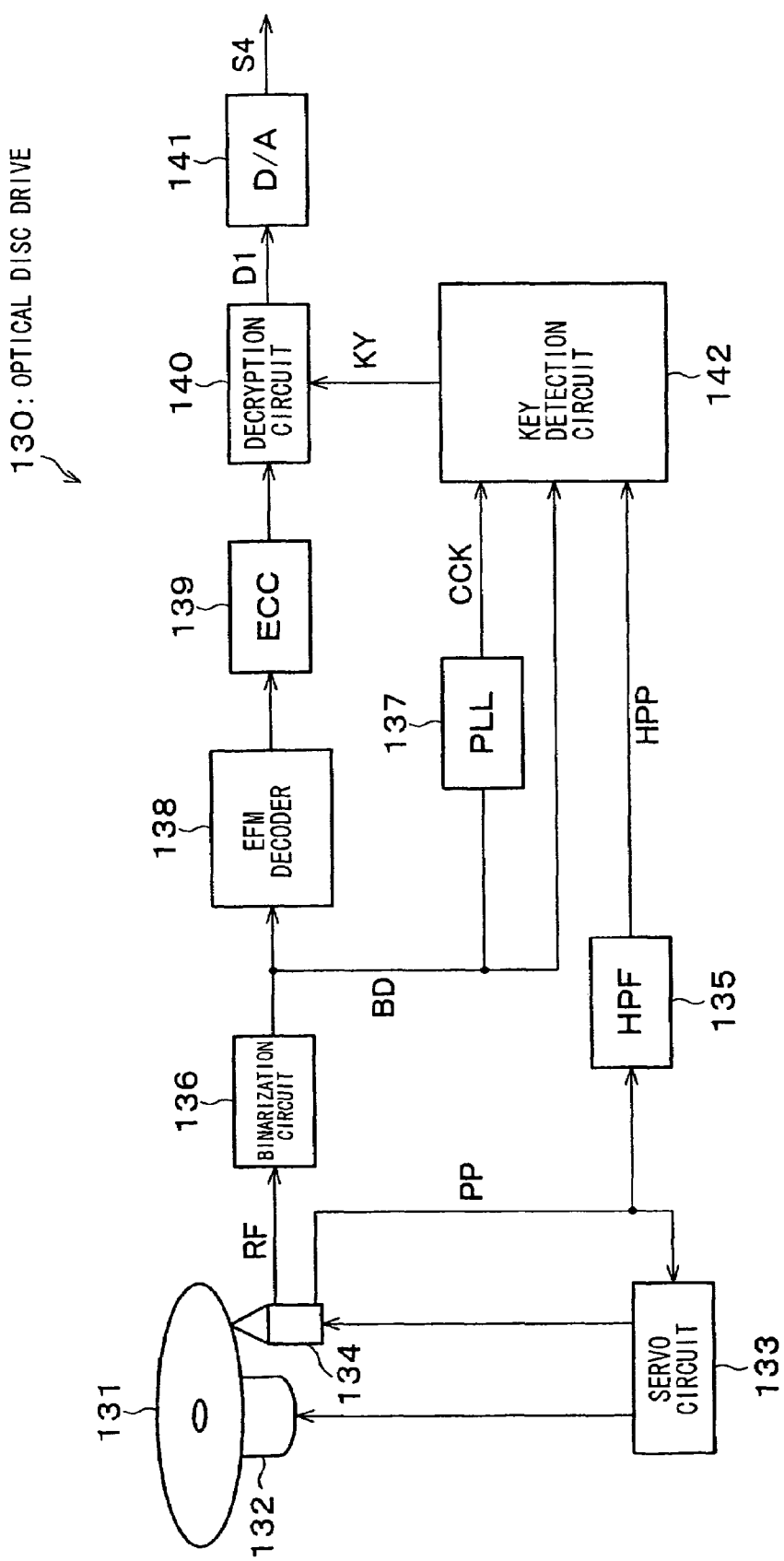
FIG. 13 is a block diagram illustrating a conventional optical disc drive.

Next, the following description deals with a structure of a reproducing device 30 and its signal processing with reference to a block diagram of FIG. 10. The reproducing device 30 reproduces an optical disc 14, on which the main data and the sub data are recorded. Note that a reproducing device 20 (shown in FIG. 1; described later) of the present invention is premised on the reproducing device 30.

The reproducing device 30 includes an optical head 2, a detection circuit 3, a main data processing circuit 4, a decoding circuit 5, a decompressing circuit 6, a control circuit 11, an integration circuit 12, and an error correction circuit 13.

The optical disc 14 is rotated by a spindle motor (not shown). The optical head 2 irradiates a light beam to the optical disc 14, and carries out photoelectric conversion with respect to the light reflected from the optical disc 14 so as to generate and output a reproduction signal to the detection circuit 3. The detection circuit 3 detects various signals, such as a radio frequency signal RF and a push-pull signal PP, from the reproduction signal. The radio frequency signal RF is sent to the main data processing circuit 4, and the push-pull signal PP is sent to the integration circuit 12.

The main data processing circuit 4 processes the radio frequency signal RF so as to detect the main data DT, which is encrypted audio data, encrypted image data, or the like. Then, the main data DT is sent by the main data processing circuit 4 to the decoding circuit 5. Concurrently, according to the radio frequency signal RF, the main data processing circuit 4 detects the ECC block, the sector, and a head location of the frame, and then generates and outputs a head location signal SC, indicating where the head location is, to the control circuit 11.

The push-pull signal PP detected by the detection circuit 3 is used not only for a tracking servo, but also for detection of the sub data, because it is possible to detect the pit displacement in the radial direction as modulation amount of the push-pull signal PP. Note that, in FIG. 10, a block illustrating a servo signal processing is omitted, and only a block relating to the push-pull signal PP is shown as a block for processing the sub data.

The integration circuit 12 carries out an integration processing with respect to the push-pull signal PP. The integration processing is carried out with respect to each bit of the sub data. Then, the integration circuit 12 binarizes a result of the integration processing so as to generate binary data, which is "0" or "1". After that, the binary data is sent to the error correction circuit 13.

Note that the integration circuit 12 carries out analog/digital (A/D) conversion with respect to the push-pull signal PP, and then performs the integration processing thereto. Thus, the integration circuit 12 integrates (accumulates) the digital data (push-pull data) obtained by an A/D converter, which has sampled the push-pull signal PP.

The integration processing allows the signal amount for detecting the sub data to increase, even though each pit P shown in FIG. 9 has the minute displacement of the amount $\Delta X$. Further, this integration processing allows the variation in the displacement amount $\Delta X$ of the pits P to be averaged, thereby improving SN ratio of the signal for detecting the sub data.

The error correction circuit 13 carries out a predetermined error correction processing with respect to the binary data row (bit sequence), corresponding to one frame, which are sequentially outputted from the integration circuit 12. This causes the encryption key data KY, which is served as the sub data, to be generated and outputted to the decoding circuit 5.

The control circuit 11 controls the integration processing of the integration circuit 12 in accordance with the head location signal SC sent from the main data processing circuit 4.

The decoding circuit 5 carries out a decoding processing with respect to the main data DT in accordance with the encrypted key data KY sent from the error correction circuit 13, the main data DT being sent from the main data processing circuit 4. The main data decoded by the decoding circuit 5 is sent to the decompressing circuit 6, in which a decompressing processing is carried out to the decoded data. On this account, the original audio data or the original image data is obtained.

The following description discusses the integration processing carried out by the integration circuit 12 under control of the control circuit 11, and also discusses a subsequent processing carried out in accordance with a result of the integration processing, with reference to FIG. 11(a) through FIG. 11(e).

It is assumed that FIG. 11(a) illustrates respective bits of the sub data that are to be reproduced. Specifically, it is assumed that BIT 0 is "0", BIT 1 is "1", BIT 2 is "1", and BIT Nb is "0". The BIT 0 through the BIT Nb constitute one frame of the sub data.

When the reproducing device 30 starts reproducing processing, the control circuit 11 divides one frame in accordance with the head location signal SC received from the main data processing circuit 4. This allows the control circuit 11 to find a timing, which corresponds to a head location of each bit, and a timing, which corresponds to a boundary location of two channel bits of each bit. Then, the control circuit 11 outputs a cyclic signal (see FIG. 11(b)) to the integration circuit 12 in accordance with the timing thus found. The cyclic signal indicates positive/negative sign of the integration carried out by the integration circuit 12. Specifically, during a period that corresponds to a first channel bit of the channel bits, the cyclic signal indicates positive (i.e., addition). Meanwhile, during a period that corresponds to a second channel bit of the channel bits, the cyclic signal indicates negative (i.e., subtraction). Note that, in FIG. 11(b), the period of the addition is indicated by a sign "+", and the period of the subtraction is indicated by a sign "−".

When the integration circuit 12 receives the cyclic signal from the control circuit 11, the integration circuit 12 resets an integration result to "0" in accordance with the timing that corresponds to the head location of each bit, and then carries out the integration processing.

As described above, during the period that corresponds to the first channel bit, the addition is carried out, whereas, during the period that corresponds to the second channel bit, the subtraction is carried out. This is because the sub data is recorded after the modulation processing. Specifically, because the sub data is recorded after the modulation processing is carried out in accordance with the PE method, the boundary, between the first and second channel bits, causes a sign of the push-pull signal PP to be always reversed as shown in FIG. 11(c). By carrying out the addition with respect to the push-pull signal PP during the period that corresponds to the first channel bit, and by carrying out the subtraction with respect to the push-pull signal PP during the period that corresponds to the second channel bit, it is possible that the integration result monotonously increases or monotonously decreases, as time go on, within a period that corresponds to each bit as shown in FIG. 11(d). Therefore, an integration result V0 at a point that corresponds to an end of the BIT 0 is: V0 (>0). An integration result V1 at a point that corresponds to an end of the BIT 1 is: V1 (<0). Further, an integration result V2 at a point that corresponds to an end of the BIT 2 is: V2 (<0). Further, an integration result VNb at a point that corresponds to an end of the BIT Nb is: VNb (>0). Then, these integration results are respectively binarized in accordance with a threshold of "0", so as to realize that the original sub data, i.e., the BIT 0 is "0", the BIT 1 is "1", the BIT 2 is "1" and the BIT Nb is "0", respectively.

Note that FIG. 11(c) illustrates exaggerated amplitude of the push-pull signal PP for the purpose of easy understanding. However, actually, the push-pull signal PP has so minute amplitude that it is difficult to obtain the binary data (see FIG. 11(e)) directly from the push-pull signal PP.

In the optical disc 14, each bit has a sufficiently long bit length. On this account, the reproducing device 30, which reproduces the optical disc 14, secures a sufficiently long period of time for carrying the integration processing for each bit. This allows the integration results to have a sufficient SN ratio. The integration processing continues, for example, in the order of 200 ms. On this account, even when the push-pull signal PP has the worst signal quality, the encryption key data KY is accurately obtained.

Generally, when a reproducing device reproduces the optical disc 14, the signal quality of the push-pull signal PP changes due to a disturbance such as an unfocussed optical head, and/or a tilt of the optical disc. When such a disturbance is large, the signal quality of the push-pull signal PP deteriorates. Therefore, in order that the signal for detecting the sub data has a sufficient SN ratio, the integration processing needs to be carried out for a long time.

On this account, in the reproducing device 30, the accumulation processing is designed to be carried out for such a sufficient long time that obtains an accurate key data KY, even in a state of a possible worst signal quality during normal reproducing. Namely, each bit has such a sufficiently long bit on the optical disc that the reproducing device 30 can carry out the integration processing for such a long time as described above.

However, when the signal quality of the push-pull signal PP is good, the reproducing device 30 carries out the integration processing for a longer period of time than necessary. The following description deals with a structure and a processing, in which the time taken for the integration processing is minimized to such a degree that accurate encryption key data KY can be obtained.

Figure 1:
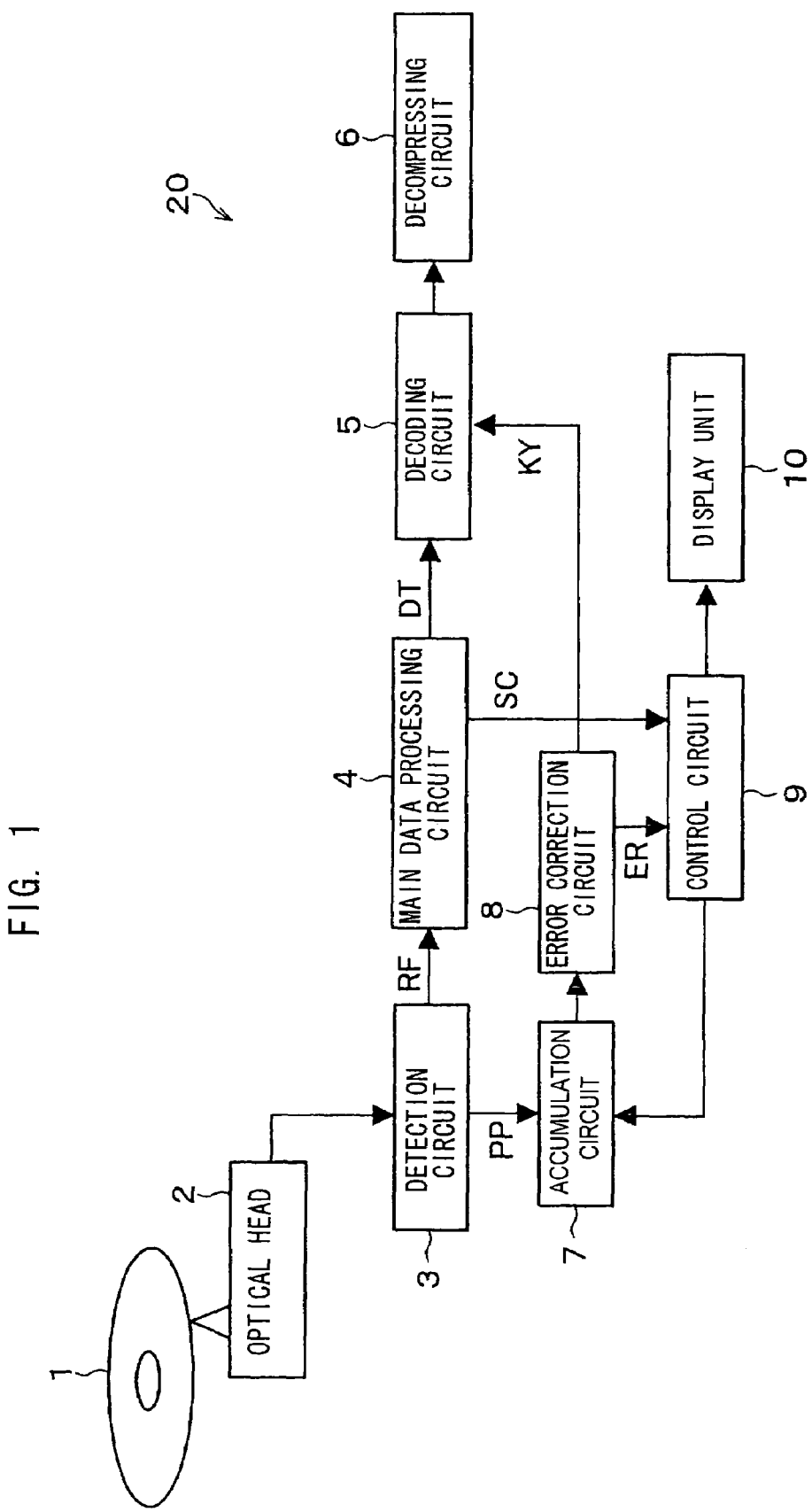
FIG. 1 is a block diagram illustrating a structure of a reproducing device of one embodiment of the present invention.
Figure 2:
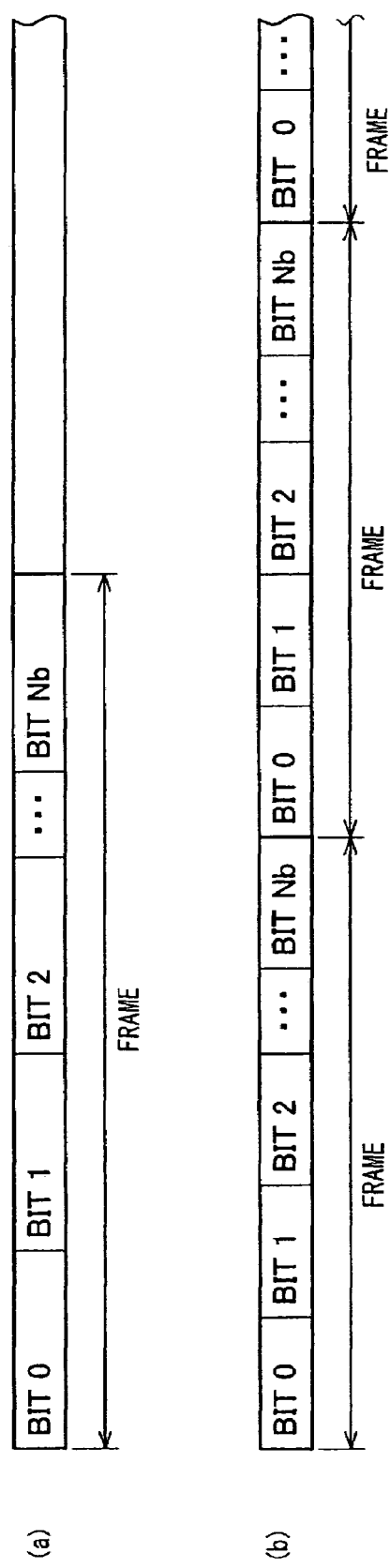
FIG. 2 is an explanatory diagram illustrating a frame and bits of an optical disc, which is reproduced by the reproducing device shown in FIG. 1, and illustrating a frames and bits of another optical disc.

The following description deals with a structure and a processing of a reproducing device 20 for reproducing an optical disc 1 with reference to FIG. 1.

The reproducing device 20 includes an optical head 2, a detection circuit 3, a main data processing circuit 4, a decoding circuit 5, a decompressing circuit 6, an integration circuit 7, an error correction circuit 8, a control circuit 9, and a display unit 10. The optical head 2, the detection circuit 3, the main data processing circuit 4, the decoding circuit 5, and the decompressing circuit 6 have similar structures and functions to those in the reproducing device 30 (see FIG. 10), respectively. For convenience, explanation thereof is omitted here.

Like the optical disc 14, the optical disc 1 has a data format shown in FIG. 8. However, the optical disc 1 differs from the optical disc 14 in the following points.

The first difference is a bit length on the optical disc. Each bit on the optical disc 14 has such a sufficiently long bit length that accurate encryption data KY is obtained even in a state of a possible worst signal quality during normal reproducing. On the contrary, each bit on the optical disc 1 has such a minimum bit length that can obtain accurate encryption data KY when the push-pull signal PP has the best signal quality. Alternatively, the bit on the optical disc 1 may have shorter bit length than the minimum bit length.

Note that, for ease of explanation, it is assumed that, in the optical disc 1, a frame length of one frame of the main data is identical to that of one frame of the sub data.

The second difference is that, in the optical disc 1, a plurality of sub data having a single content (same content) is recorded more than once. More specifically, sub data having a single content is recorded on the optical disc 1 more than once in a series of frames. This is because the reproducing device 20 occasionally carries out the integration processing with the use of a plurality of the frames, as later described. Of course, it depends on the signal quality of the push-pull signal PP. Note that the sub data may be recorded more than once over a plurality of the sectors of the main data, or over a plurality of the ECC blocks of the main data. The optical disc 14 differs from the optical disc 1 in that the sub data is not necessarily recorded more than once.

Like the integration circuit 12, the integration circuit 7 carries out the integration processing with respect to the push-pull signal PP. The integration processing allows amount of a signal for detecting the sub data to increase, even though each pit P (see FIG. 9) has minute displacement amount of ΔX. Further, this integration processing allows the variation in the displacement amount ΔX of the pits P to be averaged, thereby improving an SN ratio of the signal for detecting the sub data.

Figure 3:
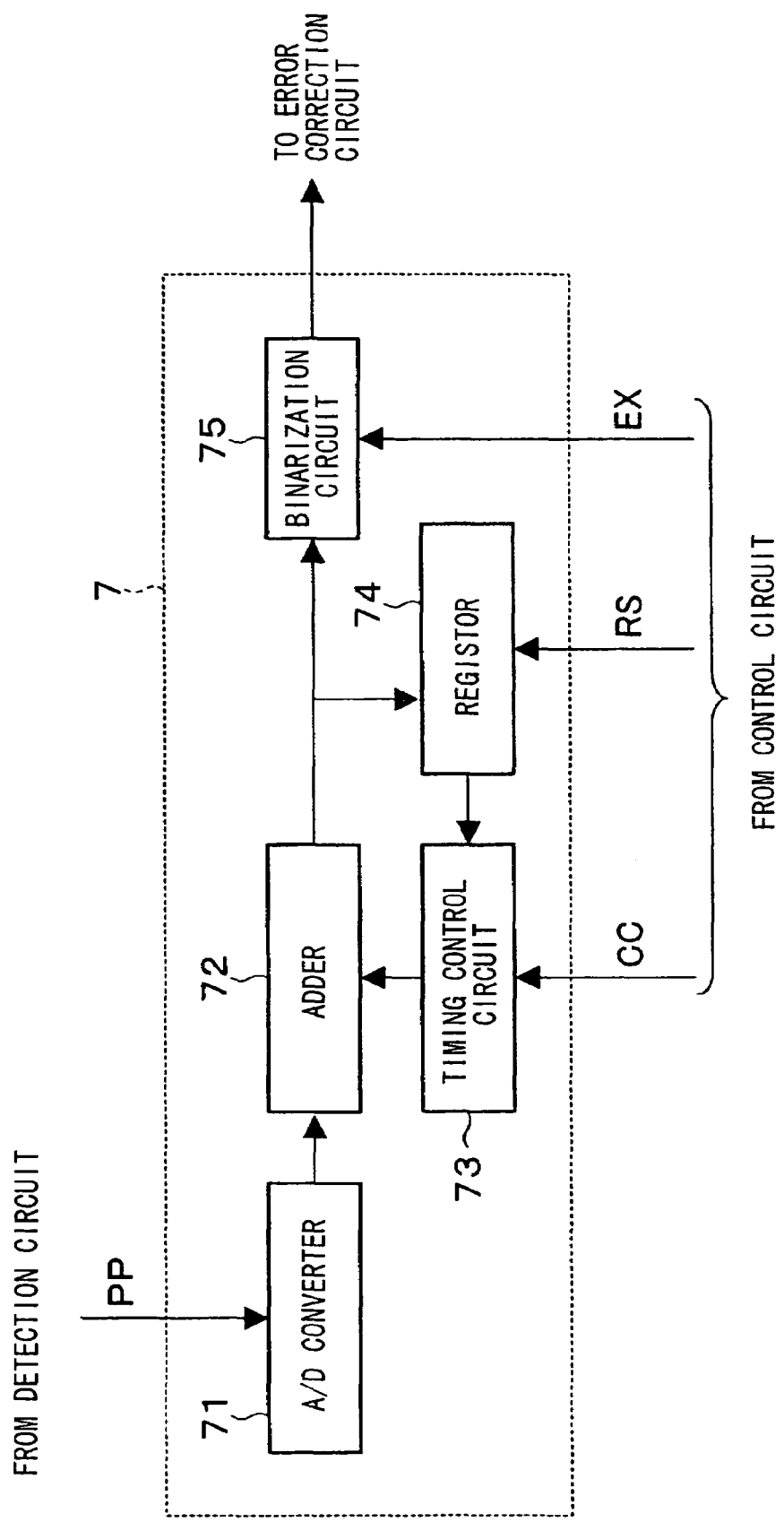
FIG. 3 is a block diagram illustrating a structure of an integration circuit of the reproducing device shown in FIG. 1.

Here, a detail description of the integration circuit 7 is made with reference to a block diagram shown in FIG. 3. The integration circuit 7 includes an A/D converter 71, an adder 72, a timing control circuit 73, registers 74, and a binarization circuit 75.

The A/D converter 71 samples the push-pull signal PP, which is an analog signal, so as to generate digital data (push-pull data). Then, the push-pull data is sent to the adder 72. The sampling is carried out at a sufficiently higher sampling rate as compared with a frequency at which each channel bit is read out. This allows the sampling to be carried out more than once during the reading out of each channel bit.

The adder 72 sequentially integrates the push-pull data, which is cyclically sent from the A/D converter 71, and outputs each integration result to the register 74 and the binarization circuit 75, respectively. The timing circuit 73 sets a start/end timing of the integration for the adder 72, an initial value of the integration for the adder 72, and the like.

The resisters 74 are provided so that the number is coincident with the number of bits in one frame. Namely, (Nb+1) registers are provided so as to correspond to (Nb+1) bits in one frame, respectively. Each of the registers 74 individually saves the integration result of the bit. Note that, in FIG. 3, only one of the registers 74 is shown for simplification of the figure. Each time the register 74 receives an integration result of the corresponding bit from the adder 72, the register 74 is updated. Therefore, at the moment that the integration processing for one frame is finished, the integration results of the (Nb+1) bits are saved in the registers 74, respectively. The registers 74 are initialized by a reset signal RS outputted from the control circuit 9 (described later).

The binarization circuit 75 binarizes each integration result, obtained when the integration for each bit is finished, in accordance with an executing signal EX outputted from the control circuit 9. This allows binary data "0" or "1" to be generated and sent to the error correction circuit 8. Note that the integration result is binarized in accordance with a threshold set at "0". That is, when the integration result is less than "0", the binary data is judged to be "1". On the other hand, when the integration result is "0" or greater, the binary data is judged to be "0".

When the timing circuit 73 receives the cyclic signal CC from the control circuit 9, the timing circuit 73 outputs, to the adder 72 as an initial value of the integration, an integration result, which has been stored in the register 74 corresponding to a bit, in accordance with a timing corresponding to a head location of the bit. Thus, the integration starts. Further, the timing circuit 73 causes the adder 72 to add a push-pull data, which is outputted from the A/D converter 71 in accordance with a predetermined sampling rate, during a period of time when a sign of the cyclic signal CC is "positive". On the other hand, the timing circuit 73 causes the adder 72 to subtract such a push-pull data during a period of time when a sign of the cyclic signal CC is "negative". Note that detail description of the cyclic signal CC is made later.

Like the error correction circuit 13, the error correction circuit 8 carries out a predetermined error correction processing with respect to a bit sequence, which corresponds to one frame and is outputted from the integration circuit 7, so as to generate encryption key data KY, which is served as the sub data. Thereafter, the encryption key data KY is sent to the decoding circuit 5. Further, the error correction circuit 8 outputs an error signal ER to the control circuit 9. The error signal ER indicates whether the error is correctable or uncorrectable.

The error correction theory is a well-known technique, and detail is described in, for example, "Fugou-riron (theory of code)," published by the SHOKODO CO. LTD. The error correction code will be suitably selected in accordance with required correction ability, a code length, a scale of hardware, or the like, and may be a humming code, a BCH (Bose-Chaudhuri-Hochquenghem) code, Reed-Solomon code, or the like. For example, in the Reed-Solomon code on Galois Field GF ($2^4$), one symbol is made up of 4 bits, and a code length is 15 symbols. Therefore, the Reed-Solomon code can contain 60 bits (4 bits×15=60 bits) of data at maximum. Further, if it is assumed that the code length is n symbols, and the encryption key data KY is k symbols, then maximum error correction ability is given by (n−k)/2.

Figure 4:
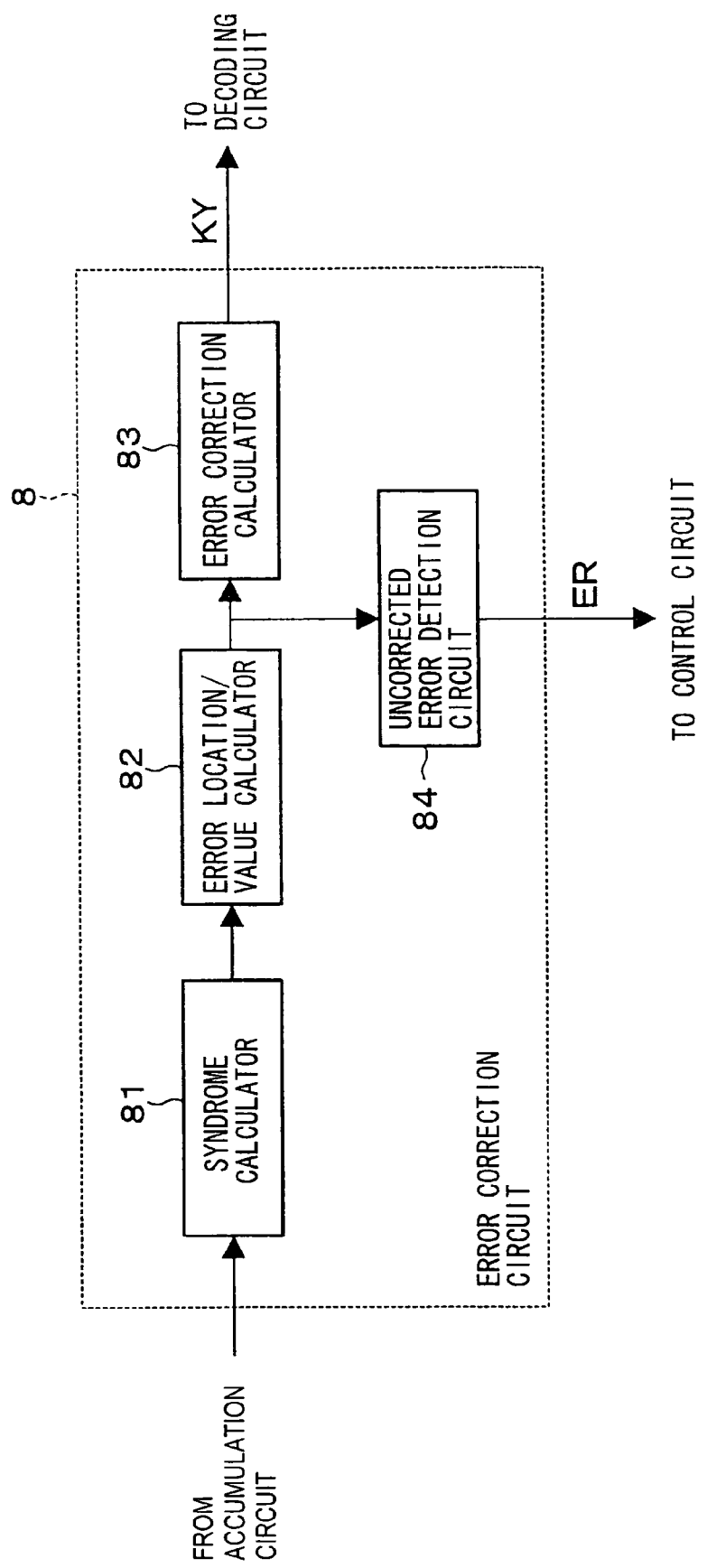
FIG. 4 is a block diagram illustrating a structure of an error correction circuit of the reproducing device shown in FIG. 1.

Here, detail description of the error correction circuit 8 is made with reference to a block diagram shown in FIG. 4. Note that the error correction circuit 8 is assumed to carry out the error correction in accordance with the Reed-Solomon codes. The error correction circuit 8 includes a syndrome calculator 81, an error location/value calculator 82, an error correction calculator 83, and an uncorrected error detection circuit 84.

The syndrome calculator 81 calculates a syndrome, which is served as error data, based on a bit sequence sent from the integration circuit 7.

The error location/value calculator 82 finds an error location and an error value from the syndrome calculated by the syndrome calculator 81, the error location and the error value being necessary for error correction.

The error correction calculator 83 corrects the error in accordance with the error location and the error value which are found by the error location/value calculator 82. Then, the error correction calculator 83 outputs a correction result, as the encryption key data KY, to the decoding circuit 5.

The uncorrected error detection circuit 84 recognizes an error location of a symbol and an error value of the symbol in accordance with the error location and the error value, which are found by the error location/value calculator 82. When an error occurs beyond maximum error correction ability of the error correction calculator 83, the uncorrected error detection circuit 84 outputs an error signal ER of "1" to the control circuit 9 so as to inform that an uncorrectable error occurs. When an error falls within the maximum error correction ability, the uncorrected error detection circuit 84 outputs an error signal ER of "0".

Like the control circuit 11, the control circuit 9 controls the integration processing of the integration circuit 12 in accordance with the head location signal SC sent from the main data processing data circuit 4. Further, the control circuit 9 carries out a processing in accordance with the error signal ER sent from the error correction circuit 8. The processing includes the following steps starting with the integration processing and ending up with an output of the encryption key data KY.

Figure 5:
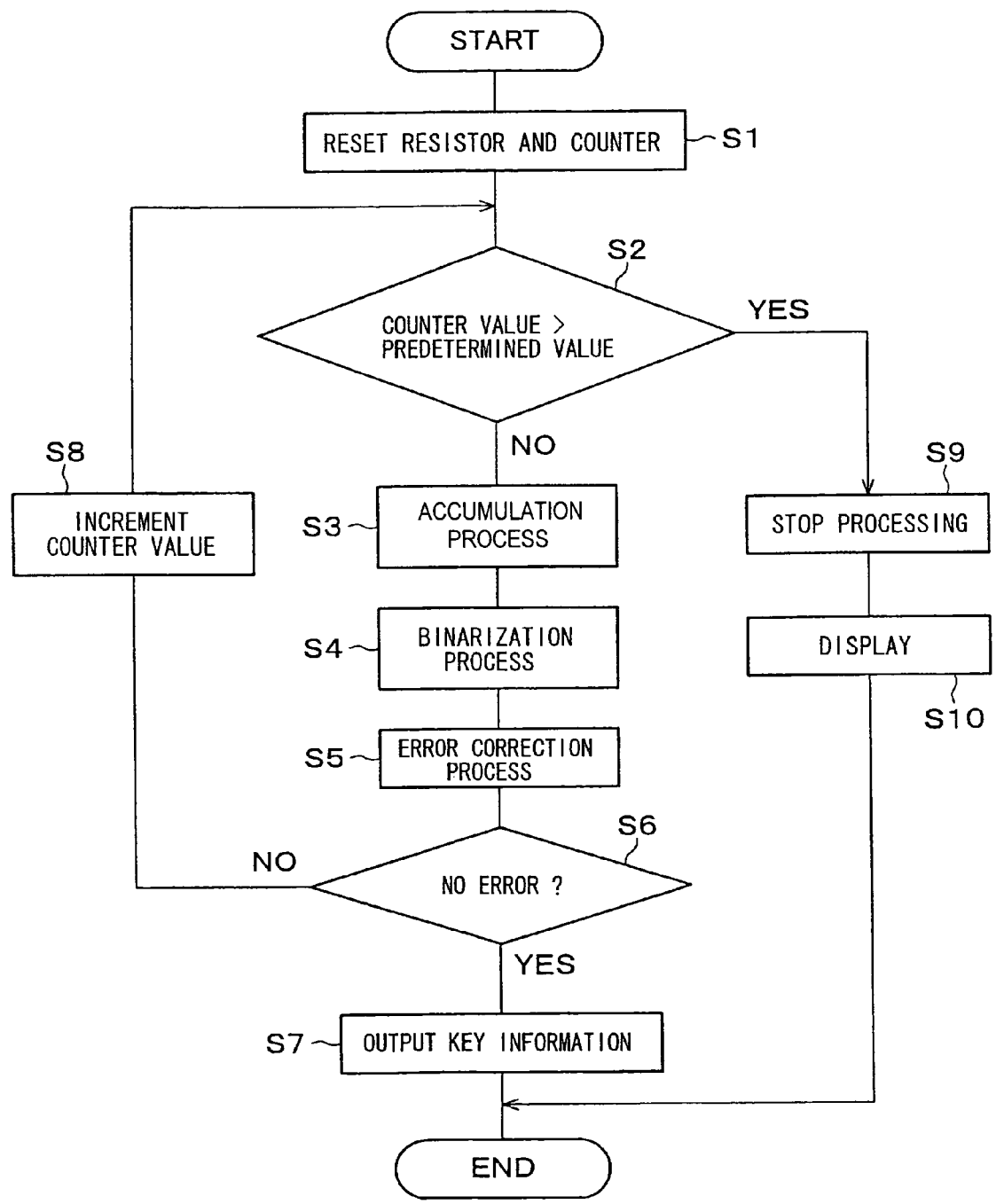
FIG. 5 is a flowchart illustrating a flow of processing in the reproducing device shown in FIG. 1.
Figure 6:
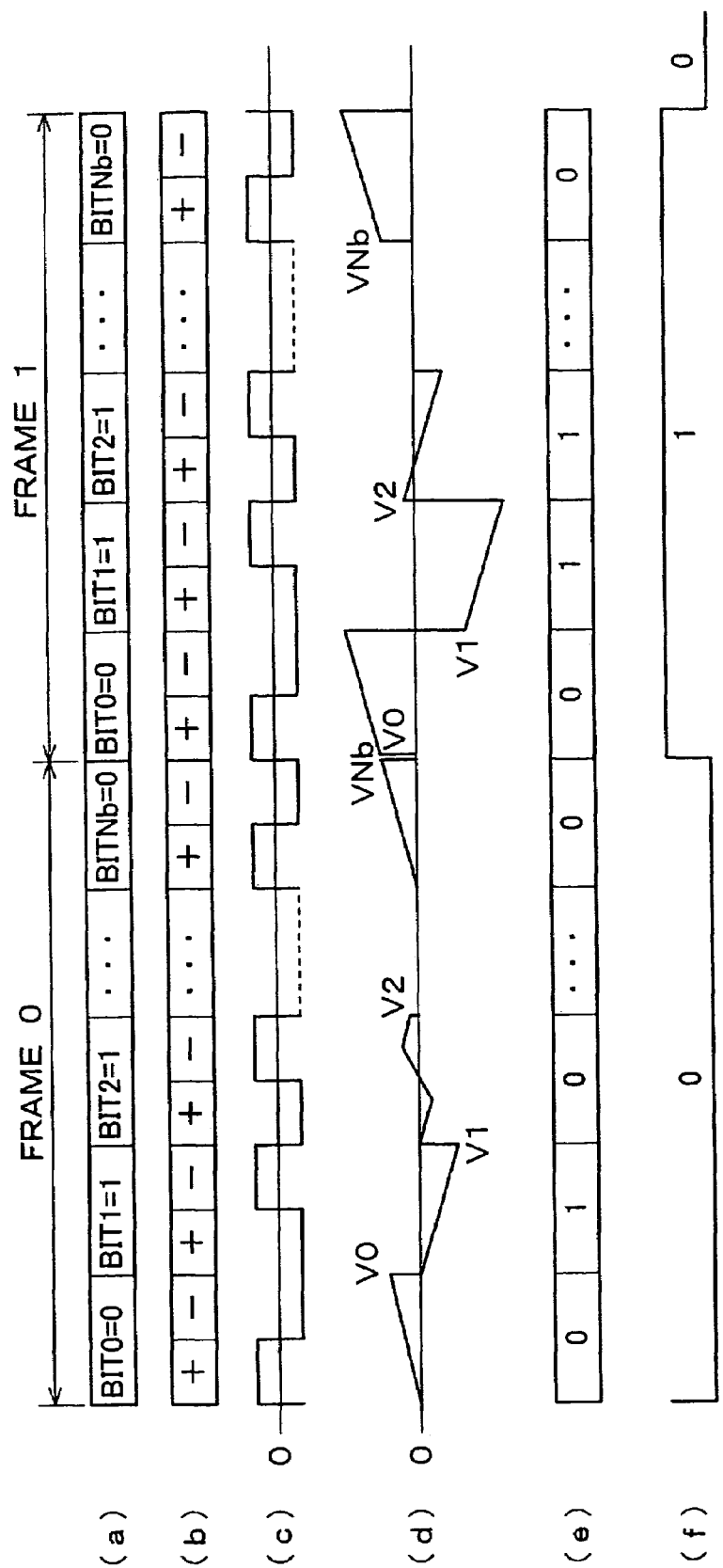
FIG. 6(a) is a timing chart illustrating a sequence of reproduction of the bits and the frames on the optical disc to be reproduced by the reproducing device shown in FIG. 1.
FIG. 6(b) is a timing chart illustrating a cyclic signal outputted from a control circuit outputs to the integration circuit in the reproducing device of FIG. 1.
FIG. 6(c) is a timing chart illustrating a push-pull signal that a detection circuit outputs to the integration circuit in the reproducing device of FIG. 1.
FIG. 6(d) is a timing chart illustrating an integration result of a push-pull signal shown in FIG. 6(c).
FIG. 6(e) is a timing chart illustrating binary data obtained by binarizing the integration result shown in FIG. 6(d).
FIG. 6(f) is a timing chart illustrating an error signal indicating whether an error is correctable or uncorrectable in accordance with the binary data shown in FIG. 6(e).

The following description deals with a flow starting with the integration processing and ending up with the output of the encryption key data KY with reference to a flowchart shown in FIG. 5. Note that FIG. 6(a) to FIG. 6(f) (timing charts) show how various signals, associated with the integration processing and the error correction processing, change as time goes on.

It is assumed that FIG. 6(a) illustrates values of respective bits of the sub data that is to be reproduced. Specifically, it is assumed that BIT 0 is "0", BIT 1 is "1", BIT 2 is "1", and BIT Nb is "0", respectively. The BIT 0 through the BIT Nb constitute one frame of the sub data. Each frame has the same sub data.

When the reproducing device 20 starts the reproducing processing, the control circuit 9 outputs a reset signal RS to the integration circuit 7 so as to start the integration processing. The reset signal RS initializes the registers 74 of the integration circuit 7, and sets an initial value of each register 74 to "0". Further, the control circuit 9 initializes and sets to "0" a counter, which is provided in the control circuit 9 and counts the number of frames (the number of integrated frames) to which the integration processing has been carried out. Thus, a step S1 is performed.

Next, the control circuit 9 judges whether or not the number counted by the counter (i.e., the number of the frames to which the integration processing has been carried out) is more than a predetermined value (a step S2). However, because the counted value is "0" at the launch of the integration processing (the step S2: No), the processing is brought into a step S3.

In the step S3, the integration processing is carried out by the integration circuit 7. On this occasion, the control circuit 9 divides one frame in accordance with the head location signal SC, which is received from the main data processing circuit 4. This allows (i) the timing corresponding to the head location of each bit, and (ii) the timing corresponding to a boundary location of two channel bits of each bit to be found, respectively. Then, the control circuit 9 outputs the cyclic signal CC (see FIG. 6(b)) to the integration circuit 7 in accordance with the timing thus found. The cyclic signal CC indicates the positive/negative sign of the integration carried out by the integration circuit 7. Specifically, during the period that corresponds to the first channel bit of the two channel bits, the cyclic signal CC indicates positive (i.e., the addition). On the other hand, during a period that corresponds to the second channel bit of the two channel bits, the cyclic signal indicates negative (i.e., the subtraction). Note that, in FIG. 6(b), the period of the addition is indicated by a sign "+", and the period of the subtraction is indicated by a sign "−".

The timing circuit 73 of the integration circuit 7 receives the cyclic signal CC sent from the control circuit 9. Then, the timing circuit 73 outputs to the adder 72, as the initial value of the integration, the integration result, which has been stored in the register 74 corresponding to a bit, in accordance with a timing corresponding to a head location of the bit. Thus, the integration starts.

Because the respective registers 74 are initialized by the control circuit 9 at the launch of the integration processing, the resisters 74 each have an initial value "0". Therefore, as to the first frame (FRAME 0) in the integration processing, the initial value for FRAME 0 is set to "0". Then, as to the second frame (FRAME 1), integration results of the FRAME 0 are saved in the registers 74, respectively, as respective initial values. Then, the next integration processing is carried out based on the newly set respective initial values.

The timing circuit 73 causes the adder 72 to add the push-pull data, which is outputted from the A/D converter 71 in accordance with a predetermined sampling rate, during the period of time when the sign of the cyclic signal CC is "positive". On the other hand, the timing circuit 73 causes the adder 72 to subtract the push-pull data during the period of time when the sign of the cyclic signal CC is "negative".

As described above, during the period that corresponds to the first half channel bit, the addition is carried out, whereas, during the period that corresponds to the last half channel bit, the subtraction is carried out. This is because the sub data is recorded after the modulation processing. Specifically, because the sub data is recorded after the modulation processing is carried out in accordance with the PE method, the boundary, between the first and second channel bits, causes a sign of the push-pull signal PP to be always reversed as shown in FIG. 6(c). By carrying out the addition with respect to the push-pull data during the period that corresponds to the first half channel bit, and by carrying out the subtraction to the push-pull data during the period that corresponds to the last half channel bit, it is possible that the integration result monotonously increases or monotonously decreases, as time goes on, within a period that corresponds to each bit as shown in FIG. 6(d). Further, each integration result thus obtained is binarized in accordance with a threshold of "0", thereby generating the sub data that has not yet been modulated (see FIG. 6(e)).

Here, FIG. 6(c) shows the push-pull signal PP, which varies in accordance with a direction of the pit displacement. A positive value of the push-pull signal PP corresponds to the displacement of the pit in an outer direction of the optical disc 1. A negative value of the push-pull signal PP corresponds to the displacement of the pit in an inner direction of the optical disc 1. For example, during the period that corresponds to the first half channel bit of the BIT 0, the push-pull signal PP has a positive value in response to the displacement of the pit in the outer direction. Further, during the period that corresponds to the last half channel bit of the BIT 0, the push-pull signal has a negative value in response to the displacement of the pit in the inner direction.

Note that FIG. 6(c) illustrates an ideal waveform of the push-pull signal PP. In fact, however, the push-pull signal PP has a blunt waveform, and the positive and negative of the push-pull signal PP may possibly be reversed by a disturbance. Note also that FIG. 6(c) shows exaggerated amplitude of the push-pull signal PP for the purpose of easy understanding. However, actually, the push-pull signal PP has so minute amplitude that it is difficult to obtain the binary data (shown in FIG. 11(e)) directly from the push-pull signal PP shown in FIG. 6(e).

FIG. 6(d) illustrates how each integration result changes as time goes on, the integration result being saved in each register 74 corresponding to each bit. During a period that corresponds to the first half channel bit of the BIT 0, the integration result gradually increases in its value. This is because the positive value of the push-pull data continues to be added during such a period. Further, during a period that corresponds to the last half channel bit of the BIT 0, the integration result still increases in its value. This is because the negative value of the push-pull data continues to be subtracted during such a period. Therefore, at the time that corresponds to an end point of the BIT 0, the integration result is: V0 (>0). In like manner, during the period that corresponds to the first half channel bit of the BIT 1, the integration result gradually decreases in its value. Further, during the period that corresponds to the last half channel bit of the BIT 1, the integration result still decreases in its value. Therefore, at the time that corresponds to an end point of the BIT 1, the integration result is: V1 (<0). The BIT 2 should have had the integration result of V2 (<0), however, the integration result is: V2 (>0) because the optical disc 1 has a faulty point in its portion corresponding to the BIT 2 of the FRAME 0, and the faulty points causes the push-pull signal PP to be disturbed. This is shown in FIG. 6(d).

At the time that corresponds to the end point of each bit, the control circuit 9 outputs the executing signal EX to the binarization circuit 75 of the integration circuit 7 so that the binarization circuit 75 starts the binarization processing. More specifically, the binarization circuit 75 binarizes an output (i.e., an integration result) sent from the adder 72, and generates binary data of "0" or "1" (see FIG. 6(e)). Then, the binarization circuit 75 outputs the binary data to the error correction circuit 8 (step S4). Note that a threshold is set to "0", On this account, when the integration result is less than 0 like the integration result V1, the binary data is judged to be "1". On the other hand, when the integration result is 0 or greater like the integration results V0, V2, or VNb, the binary data is judged to be "0". In FIG. 6(e), the binary data that corresponds to the BIT 2 should have been "1" under normal circumstances, however, actually is "0".

Note that the integration processing (step S3) and the binarization processing (step S4) are shown as a series of processing in the flowchart of FIG. 5, however, these respective processing are actually repeated with respect to each bit.

The content stored in each of the registers 74 in the integration circuit 7 is sequentially updated in accordance with the integration result of the corresponding bit. Therefore, at the end of the FRAME 0, the integration results V0, V1, V2, ..., and VNb are saved in the registers 74, respectively, that correspond to the BITs 0, 1, 2, ..., and VNb, respectively.

When the integration processing and the binarization processing, both of which are for the FRAME 0, are finished, the error correction circuit 8 carries out an error correction based on the bit sequence, which is sent from the binarization circuit 75 (step S5). On this occasion, the uncorrected error detection circuit 84 of the error correction circuit 8 outputs to the control circuit 9 the error signal ER indicative of whether the error is correctable or uncorrectable.

The error signal ER is shown in FIG. 6(f), and indicates "0" as an initial value. When the error is correctable, the error signal ER is "0". When the error is not correctable, the error signal ER is "1". In FIG. 6(f), the error is not correctable in the FRAME 0. In response to the changing from FRAME 0 to FRAME 1, the error signal ER is changed from "0" to "1". Note that it is assumed that the error in the FRAME 0 became uncorrectable because the binary data, corresponding to a plurality of bits other than the BIT 2, were erroneously outputted during the FRAME 0.

If the error is uncorrectable (step S6: No), then the error correction circuit 8 does not output the encryption data KY. When the control circuit 9 receives the error signal ER indicating that the error is uncorrectable, the control circuit 9 causes the counter to be increased by 1, the counter counting the number of integrated frames (step S8). Thereafter, the processing is brought back to the step S2.

The following description deals with the case where the error of the FRAME 0 is not correctable, and the step S3 and later steps are carried out again with respect to the FRAME 1.

In the step 3, the integration processing is carried out again by the integration circuit 7. On this occasion, the control circuit 9 continues to output the cyclic signal CC (see FIG. 6(b)) to the integration circuit 7. In the integration circuit 7, when the timing circuit 73 receives the cyclic signal CC from the control circuit 9, the timing circuit 73 outputs to the adder 72, as an initial value, an integration result of the FRAME 0, which has been stored in the register 74 corresponding to a bit, in accordance with a timing corresponding to a head location of the bit. Thus, the integration starts.

Specifically, the integrations of the respective bits start, provided that the integration results V0, V1, V2, ..., and VNb saved in the registers 74, respectively, that correspond to the BITs 0, 1, 2, ..., and VNb, respectively, are set to the initial values. Specifically, as to the BIT 0, its integration result gradually increases, provided that V0 is the initial value. Similarly, as to the BIT 1, its integration result gradually decreases, provided that V1 is the initial value. As to the BIT 2, which does not have accurate value in the FRAME 0 due to the disturbance, the push-pull data has an accurate value in the FRAME 1 without any affection of a disturbance. As such, the integration result of the BIT 2 gradually decreases from its initial value V2, and finally reaches a negative value. Accordingly, binary data (see FIG. 6(e)), which corresponds to the BIT 2, and which is obtained by the binarization processing (the step 4) carried out with respect to the BIT 2, has an accurate value in the FRAME 1.

Then, the integration processing and the binarization processing are sequentially carried out with respect to the BIT 3 through the BIT VNb. Here, it is assumed that the subsequent error correction processing (step S5) causes the error to be correctable. If it is judged that the error is correctable (step 6: Yes), then the error correction circuit 8 outputs an error correction result, as the encryption key data KY, to the decoding circuit 5. On this occasion, the control circuit 9 receives the error signal ER indicating that the error is correctable, and stops sending the cyclic signal CC. This causes the integration processing to be stopped, thereby resulting in that the reproducing processing of the sub data is finished.

The following description discusses the case where the optical disc 1, which is in a process of reproduction, is an unauthorized copy, and on which the sub data is not accurately recorded. Namely, the following description deals with the case where no appropriate minute displacement is provided with respect to pits on the optical disc 1, In this case, a state in which an error is uncorrectable is maintained, thereby increasing accumulated count value of the counter.

It is preferable that the predetermined value in the step S2 is set to such a value of a little larger than that of integrated frames that secures a sufficient SN ratio even if a maximum disturbance occurs. For example, in cases where a sufficient SN ratio can be secured by the integration processing corresponding to 2000 frames when the maximum disturbance occurs, the predetermined value may be set to approximately "3000". This prevents an authorized optical disc 1 from being misjudged as an unauthorized copy.

However, in the case where the optical disc 1 is an unauthorized copy, the count value accumulated by the counter will exceed "3000" (step S2: Yes). If the value exceeds 3000, then the control circuit 9 stops the operations of the reproducing device 20, and the reproducing processing is accordingly stopped (step S9). Then, the control circuit 9 causes a display unit 10 to display a message indicating that no encrypted key data is found (step S10). The message may be "Cannot find encryption key data of the disc," "Cannot unprotect the copy protection of the disc," or the like.

By displaying the message to a user of the reproducing device 20, he/she recognizes that the optical disc 1 cannot be reproduced because the encryption data cannot be found, not because the reproducing device 20 is wrongly operated or is defected. Since the user thus recognizes that the encryption data cannot be found, he/she will stop buying such an optical disc which is an unauthorized copy product. This is expected to be a further effect.

Note that there is a possibility that the sub data cannot be reproduced if, in the step 2, the count value accumulated by the counter exceeds the predetermined value due to a scratch on the optical disc 1. In view of the circumstances, the reproducing processing for the sub data may be carried out again with respect to a different radial location of the optical disc 1, and if the error is still uncorrectable, then the processing may be brought into the step S9.

Note also that, here, the number of the integrated frames is compared to the predetermined value of 3000 frames, however, the total time length of the frames to be integrated may be compared to predetermined value. The total time length can be easily found by multiplying the number of the frames by the reproducing time of one frame.

As described above, even though the pits on the optical disc 1 have minute displacement, it is possible to improve (increase) the SN ratio of the signal for detecting the sub data, by carrying out the integration processing with respect to the push-pull signal PP which varies in proportion to the minute displacement of the pit. As such, the sub data can be accurately reproduced. Further, in the reproducing device 20, the sub data (the encrypted key data KY) is outputted when an error is correctable in the error correction circuit 8. On this account, the sub data can be reproduced, without an error, in the shortest processing time.

Here, a modified device of the reproducing device 20 is exemplified. In the foregoing reproducing device 20, it is judged whether or not an integration processing is further required in accordance with whether the error is correctable or uncorrectable in the error correction circuit 8. The judgment may be carried out in accordance with a parameter, which reflects the signal quality of the push-pull signal PP. As such, the judgment is not limited to be made based on whether the error is correctable or uncorrectable.

A noise level in the integration result takes the form of a variation in the integration results. As such, the above judgment may be made in accordance with such a variation in the integration results V0, V1, V2, . . . , and VNb (see FIG. 6(d)) of the respective bits.

In this case, a detection circuit is further provided for detecting the variation. When the variation detected by the detection circuit has a value of not greater than a predetermined value, (i) the integration processing is stopped, and (ii) the encryption key data KY, which is outputted from the error correction circuit 8, is sent to the decoding circuit 5.

Figure 7:
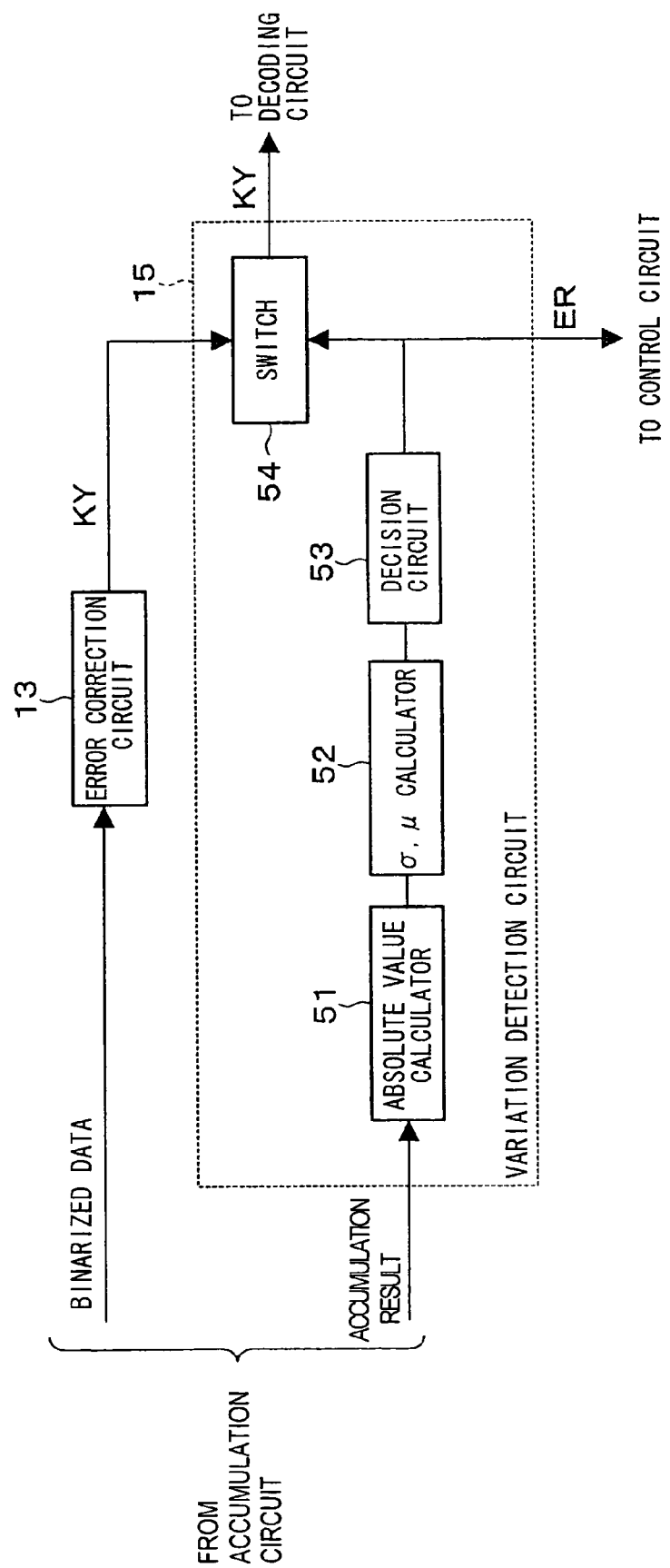
FIG. 7 is a block diagram illustrating a structure of an error correction circuit and a variation detection circuit, both of which are replaced with the error correction circuit and the control circuit which are shown in FIG. 1.

The modified example, dealt with here, is arranged so that the error correction circuit 8 and the control circuit 9 of the reproducing device 20 shown in FIG. 1 are replaced with an error correction circuit 13 and a variation detection circuit 15, respectively (see FIG. 7).

Note that the error correction circuit 13 is an ordinary error correction circuit, like the error correction circuit 13 of the reproducing device 30 (see FIG. 10). This is because the error correction circuit 13 of the modified example does not need to output the error signal ER. As such, the error correction circuit 13 has such a structure that the uncorrected error detection circuit 84 is omitted from the error correction circuit 8(shown in FIG. 4).

The variation detection circuit 15 includes an absolute value calculator 51, a σ, μ calculator 52, a decision circuit 53, and a switch 54.

In this arrangement, the error correction circuit 13 receives the binary data sent from the binarization circuit 75 (see FIG. 3) of the integration circuit 7, and carries out an error correction with respect to the binary data thus received. The variation detection circuit 15 receives the integration results (V0, V1, V2, . . . , VNb; see FIG. 6(d)) sent, at a timing that corresponds to an end point of each bit, from the respective registers 74 of the integration circuit 7. The variation detection circuit 15 carries out judgment based on the signal quality. An output of the error correction circuit 13 is sent to the decoding circuit 5 via the switch 54 of the variation circuit 15.

The absolute value calculator 51 calculates absolute values |V0|, |V1|, |V2|, . . . , |VNb| of the integration results V0, V1, V2, . . . , VNb, respectively. Then, the absolute values are respectively sent to the σ, μ calculator 52. Note that some of the integration results have positive values and the others have negative values, as shown in FIG. 6(d). When evaluating the variation, the evaluation may be made in accordance with the variation in the positive values and the variation in the negative values, respectively. Here, the absolute value calculator 51 calculates the absolute values of the integration results. As such, all the integration results are processed as positive values. This permits of providing a single σ, μ calculator 52. On this account, it is possible to realize a device having a simpler structure.

The σ, μ calculator 52 finds a standard deviation σ and an average value μ from the absolute values |V0|, |V1|, |V2|, . . . , |VNb|, and outputs them to the decision circuit 53.

The decision circuit 53 evaluates the signal quality of the push-pull signal PP in accordance with the standard variation σ and the average value μ thus found. The signal quality can be evaluated in accordance with various methods. For example, σ/μ value may be used for the evaluation of the signal quality. When the signal quality is good, the variation in the integration results is small, and the standard deviation σ is therefore small. Further, because the push-pull signal PP has a large amplitude level, the average value μ becomes large. Namely, when the signal level is good, the σ/μ value is small. On the contrary, when the signal quality is poor, the σ/μ value is large. When the σ/μ value is below a predetermined threshold, the decision circuit 53 judges the signal quality as good, and outputs an error signal ER of "0". Otherwise, the decision circuit 53 outputs an error signal ER of "1". Such a threshold for the evaluation may be set to a value experimentally found in advance. Such a value is selected from such a range, within which the experimentally found σ/μ values fall, that no error which is uncorrectable occurs.

When the switch 54 receives the error signal ER of "0" from the decision circuit 53 (i.e., when the signal quality is judged to be good), the switch 54 outputs the encryption key data KY obtained from the error correction circuit 13. Otherwise, the switch 54 does not output the encryption key data KY.

Note that, the modified example is premised on the sub data to which an error correction code is added. However, the use of the variation detection circuit 15 makes it possible to realize a reproducing device that can reproduce the sub data having no error correction code. In this case, the error correction circuit 13 (shown in FIG. 7) may be replaced with, for example, a buffer for temporarily storing the binary data.

The foregoing description deals with the reproducing device 20, which is one embodiment of the data storage medium reproducing device of the present invention, and its modified example. However, the present invention is not limited to these, and may be applied in many ways. The following description deals with applications of the present invention.

In the present embodiment, the optical disc 1 is supposed to be a CD, a DVD, a high-definition digital video disc, or the like as the data storage medium. However, the data storage medium is not limited to these, and may be a magnetic disc, or an optical magnetic disc, on both of which a pit or a record mark (mark) that takes the place of the pit is recorded. Further, the data storage medium may not be in the form of disc, and may alternatively have a different shape or a different feature.

In the present embodiment, the sub data is supposed to be recorded, on the optical disc 1, by the minute displacement of the pits in the radial direction. However, the sub data may be differently recorded. For example, the sub data may be recorded by the minute displacement of the pits in the tangential direction. In this case, for example, a difference between the radio frequency signal RF (see FIG. 1) and a reference clock that corresponds to an original reference location of each pit in the tangential direction is supplied to the integration circuit 7, and then the integration is carried out by the integration circuit 7.

In the present embodiment, on the optical disc 1, the location of the frame of the main data is supposed to be coincident with the location of the frame of the sub data. This is because the location of the frame of the sub data is recognized by using the head location signal SC sent from the main data processing circuit 4. If the location of the frame of the sub data can be recognized by using other method, then, on the optical disc 1, the location of the frame of the main data may not be coincident with the location of the frame of the sub data.

In the present embodiment, the respective units of the reproducing device 20—such as the detection circuit 3, the main data processing circuit 4, the decoding circuit 5, the decompressing circuit 6, the integration circuit 7, the error correction circuit 8, the control circuit 9, the error correction circuit 13, the variation detection circuit 15—are realized by circuit members. However, some or all of them may be realized by running a predetermined program on a computer such as a microcomputer.

As described above, the reproducing device 20 serves as a data storage medium reproducing device of the present invention, the sub data serves as recorded data, and the optical disc 1 serves as a data storage medium. The reproducing device 20 is a data storage medium reproducing device for reproducing the sub data that is recorded on the optical disc 1, and has a structure as follows.

The reproducing device 20 includes the optical head 2, the detection circuit 3, and the integration circuit 7. The optical head 2 and the detection circuit 3 serve as signal detection means for reading out the optical disc 1 and detecting the push-pull signal PP (see FIG. 6(c)), which is modulated in accordance with the sub data recorded on the optical disc 1. The push-pull signal PP serves as a reproduction signal. The integration circuit 7 serves as data detection means for generating the binary data (see FIG. 6(e)) by using one or more frame(s) of the push-pull signal PP. The binary data serves as detection data. The frame serves as a specific part. The longer the total time length of the frames, which are used to generate the binary data, is, the more accurate binary data the integration circuit 7 generates. The reproducing device 20 further includes a control circuit 9 serving as control means for controlling the total time length of the frames so as to generate valid binary data in the integration circuit 7.

The longer the total time length of the frames, which are used to generate the binary data, is, the more accurate binary data the integration circuit 7 generates. As such, in order to generate more accurate binary data, it is required for the total time length of the frames to be long. However, the long total time length causes the time taken for the integration processing carried out in the integration circuit 7 to be long. This gives rise to the prolonging of the time from a starting of the reproducing processing (i) to an outputting of the encryption key data which has actually been reproduced, and (ii) to an outputting of image data and/or audio data reproduced based on the encryption key data KY.

In view of the circumstances, in the reproducing device 20, the control circuit 9 controls the total length of the frames to be used in the integration circuit 7 so that the integration circuit 7 generates valid binary data. The term "valid binary data" indicates binary data that is recognized and handled as valid in the subsequent processing which should be carried out, based on the generated binary data, by the error correction circuit 8, the decoding circuit 5, and the like.

On this account, the accuracy of the detected sub data and the processing time can be respectively adjusted. When the adjustments are suitably carried out, it is possible to secure the accuracy of the sub data, and to reduce the processing time.

The reproducing device 20 further includes the error correction circuit 8 or the variation detection circuit 15, both of which serve as signal quality evaluation means for evaluating the signal quality of the push-pull signal PP. The error correction circuit 8 or the variation detection circuit 15 outputs the error signal ER serving as an evaluation result. Based on the error signal ER, the control circuit 9 controls the total time length of the frames.

Generally, when the signal quality of the push-pull signal PP decreases, the accuracy of the binary data generated by the integration circuit 7 tends to decrease. Further, when the signal quality of the push-pull signal PP increases, the accuracy of the binary data generated by the integration circuit 7 tends to increase.

As such, when the total time length of the frames is controlled based on the error signal ER, it is possible to carry out the following controlling. Namely, when the signal quality is poor, the total time length is adjusted to be long, thereby securing the accuracy of the binary data. In contrast, when the signal quality is good, the total time length is adjusted to be reduced, thereby shortening the processing time. On this account, it is possible to generate the binary data in accordance with the signal quality of the push-pull signal, in a shorter time while securing a predetermined accuracy.

The reproducing device 20 further includes the display unit 10 serving as annunciation means for annunciating that the optical disc 1 cannot be appropriately reproduced, when the total time length of the frames is greater than a predetermined value, and when the error signal ER indicates that there is an error. In the present embodiment, the reporting means is the display unit 10 that annunciates an error by displaying. Alternatively, the annunciation means may be realized by a member that annunciates an error by voice or the like.

On this account, a user of the reproducing device 20 can clearly understand that an appropriate reproduction cannot be carried out due to some problems of the optical disc 1. This allows the user to avoid that the user misunderstands that the appropriate reproduction cannot be made due to a defect or a wrong operation of the reproducing device 20.

Further, in the reproducing device 20, the push-pull signal PP is supposed to be modulated in accordance with a series of data units (frames) each made up of an identical bit pattern. In this case, the integration circuit 7 may include the adder 72, the timing circuit 73, the registers 74, and the binarization circuit 75. The adder 72, the timing circuit 73, and the registers 74 serve as integration means for integrating the modulation amount of the push-pull signal PP. The integration is carried out with respect to the respective bits which correspond to each other in the frames. The binarization circuit 75 generates the corresponding bit of the binary data in accordance with obtained integration result that corresponds to each bit. Further, the control circuit 9 can control the total time length of the frames in accordance with the number of the frames to be used for the integration.

By integrating the modulation amount of the push-pull signal PP, the integration result (i.e., signal amount, that serves as a foundation for generating the binary data in the binarization circuit 75), can be increased. Further, by integrating the modulation amount of the push-pull signal PP, the variation in the modulation amount can be averaged. As such, it is possible to improve SN ratio of the signal (see FIG. 6(d)), which serves as a foundation for generating the binary data in the binarization circuit 75.

On this account, even though the modulation amount is minute, it becomes possible to generate the binary data having relatively high accuracy. Further, it becomes possible to easily adjust the accuracy of the binary data in accordance with the number of the frames to be used for the integration processing in which the binary data is generated.

The reproducing device 20 further includes the error correction circuit 8 or the variation detection circuit 15, both of which serve as a detection result judgment means for judging whether the binary data is valid or invalid. When the error correction circuit 8 or the variation detection circuit 15 judges that the binary data which the integration circuit 7 has generated by using i (i is a natural number) frame(s) is invalid, i.e., when the error signal ER indicates that there is an error, the integration circuit 7 is controlled by the control circuit 9 so as to generate the binary data by using (i+1) frames.

As such, only thing to do is to increase, until the binary data generated by the integration circuit 7 is judged to be valid, the total number of the frames which are to be used for generating the binary data. This ensures that not only valid binary data but also the encryption key data KY is generated in substantially the shortest time.

Further, a method for reproducing a data storage medium in accordance with the present invention, includes the steps of: (a) detecting data, the step (a) including (i) integrating modulation amount of a push-pull signal PP with respect to the respective bits which correspond to each other in the frames in accordance with the push-pull signal PP read out from the optical disc 1, the push-pull signal PP being modulated in accordance with the repetition of the frames that are made up of the identical bit pattern (see S3 of FIG. 5), and (ii) generating binary data in accordance with integration result thus obtained (see S4 of FIG. 5); and (b) judging whether the binary data is valid or invalid (see S6 of FIG. 5), wherein: in the case where the i-th (i is a natural number) frame is used in the step (a), and the binary data is judged to be invalid (the error is uncorrectable) in the step (b), the step (a) is carried out with the use of the (i+1)-th data unit s, while the current integration result is set as an initial value of a target integration.

As such, only thing to do is to increase, until the binary data generated in the step (a) is judged to be valid, the total number of the frames which are to be used for generating the binary data. This ensures that the valid binary data is generated in substantially the shortest time.

The method may further include the step of: annunciating that an appropriate reproduction cannot be carried out, when a judgment result still shows invalid after carrying out the respective steps (a) and (b) by a predetermined number of times (see S10 of FIG. 5).

On this account, the user can recognize that an appropriate reproduction cannot be carried out. This permits of avoiding that the user misunderstands that such an appropriate reproduction cannot be carried out due to a defect or a wrong operation of a device.

As described above, a data storage medium reproducing device, for reproducing data recorded in a data storage medium, in accordance with the present invention, includes: (1) signal detection means for reading out the data storage medium, and for detecting a reproduction signal, which is modulated in accordance with recorded data; (2) data detection means for (i) generating detection data, which is an obtained detection result of the recorded data, by using one or more specific parts in the reproduction signal, and (ii) allowing accuracy of the detection data to be higher one, as a total time length of the specific parts to be used for generating the detection data is longer; and (3) control means for controlling the total time length of the specific parts to be used, by the data detection means, for generating valid detection.

Further, a method, in accordance with the present invention, for reproducing a data storage medium, which stores recorded data includes the steps of: (a) reading out the data storage medium, and detecting a reproduction signal, which is modulated in accordance with recorded data; (b) generating detection data, which is an obtained detection result of the recorded data, by using one or more specific parts in the reproduction signal, and allowing accuracy of the detection data to be higher one, as a total time length of the specific parts to be used for generating the detection data becomes longer; and (c) controlling the total time length of the specific parts to be used, in the step (b), for generating valid detection data.

With the arrangement, the accuracy of the detection data and the processing time can be adjusted, respectively. Therefore, when the adjustments are suitably carried out, the processing time can be shortened while securing a predetermined accuracy of the detection data.

The data storage medium reproducing device further includes: signal quality evaluation means for evaluating a signal quality of the reproduction signal, wherein: the control means controls the total time length in accordance with an evaluation result obtained by the signal quality evaluation means.

Generally, when the signal quality of the reproduction signal deteriorates, the accuracy of the detection data generated by the data detection means tends to be reduced. As such, when the signal quality of reproduction signal is improved, the accuracy of the detection data generated by the data detection means tends to be improved.

In view of the circumstances, when the total time length is controlled based on the evaluation result made by the signal quality evaluating means, the following controlling can be made. Specifically, when the signal quality is poor, the total time length is adjusted to be long, thereby securing the accuracy of the detection data. In contrast, when the signal quality is good, the total time length is adjusted to be shortened, thereby reducing the time taken for the processing. This controlling allows the detection data to be generated, while securing a predetermined accuracy, in accordance with the signal quality of the reproduction signal.

The data storage medium reproducing device may be arranged so that the signal quality evaluation means evaluates in accordance with a result of an error correction processing carried out with respect to the detection data.

When the data having an error correction code is recorded on the data storage medium, the signal quality of the reproduction signal can be evaluated by carrying out an error correction with respect to the detection data. Namely, the signal quality is poor when there are many errors to be corrected, or when an error is uncorrectable. On the contrary, when there are a few errors to be corrected, the signal quality is good. As such, the signal quality can be evaluated with ease.

The data storage medium reproducing device preferably further includes: annunciation means for annunciating that an appropriate reproduction cannot be carried out when the total time length is not less than a predetermined value, and when the evaluation result obtained by the signal quality evaluation means is poorer than a predetermined signal quality.

With the arrangement, a user of the data storage medium reproducing device can recognize that an appropriate reproduction cannot be carried out due to some problems arisen from the data storage medium. As such, it is possible to avoid that the user misunderstands that such an appropriate reproduction cannot be carried out due to a defect or a wrong operation of the data storage medium reproducing device.

The data storage medium reproducing device may be arranged so that the reproduction signal is modulated in accordance with repetition of data units that are made up of an identical bit pattern; the data detection means includes: (i) integration means for integrating a modulation amount of the reproduction signal with respect to the respective bits which correspond to each other in the data units, and (ii) data generating means for generating a corresponding bit of the detection data in accordance with an integrated result corresponding to each of the bits, and (iii) the control means controls the total time length in accordance with the number of the data units to be used, by the integration means, for the integrating.

By integrating the modulation amount, signal amount, that serves as a foundation for generating the detection data in the data generating means, can be increased. Further, by integrating the modulation amount, the variation in the modulation amount can be averaged, thereby improving SN ratio of the signal, that serves as a foundation for generating the detection data in the data generating means.

As such, even though the modulation amount is minute, it becomes possible to generate the detection data having relatively high accuracy. Further, it becomes possible to adjust the accuracy of the detection data with ease, in accordance with the total time length of the specific parts to be used for generating the detection data, i.e., in accordance with the number of the data units to be used for the integration in the integration means.

The data storage medium reproducing device further includes: detection result judgment means for judging whether the detection data is valid or invalid, wherein: when the detection result judgment means judges that the detection data, which the data detection means has generated by using i data units, is invalid, the control means causes the data detection means to generate detection data by using (i+1) data units, i being a natural number. Note that the detection result judgment means judges, whether the detection data is valid or in valid, by, for example, evaluating the signal quality of the reproduction signal as described above.

As such, only thing to do is to increase, until the detection data generated by the data detection means is judged to be valid, the number of the data units which are to be used for generating the detection data. This ensures that the valid detection data is generated in substantially the shortest time.

The data storage medium reproducing device may be arranged so that the detection result judgment means judges, whether the detection data is valid or invalid, in accordance with a result of an error correction processing carried out with respect to the detection data.

When the data having an error correction code is recorded on the data storage medium, the detection data can be judged whether it is valid or invalid by carrying out an error correction to the detection data. Namely, uncorrectable detection data is invalid, whereas correctable detection data is valid. Thus, it is possible to judge with ease whether or not the detection data is valid or invalid.

The data storage medium reproducing device may be arranged so that the detection result judgment means judges, whether the detection data is valid or invalid, in accordance with a variation in the integration results that corresponds to the respective bits.

It would appear that the variation in the integration results is due to a noise. Therefore, when the variation in the integration results is large, the detection data generated according to the integration result is greatly affected by the noise. As such, the accuracy of the detection data would appear to be bad (low). In such a case, it is possible to judge that the detection data is invalid. On the contrary, when the variation in the integration results is small, the detection data generated according to the integration result is not affected by the noise so much. As such, the accuracy of the detection data would appear to be good (highly reliable). In such a case, it is possible to judge that the detection data is valid. Thus, it is possible to easily judge whether the detection data is valid or invalid.

The data storage medium reproducing device preferably further includes: annunciation means for annunciating that an appropriate reproduction cannot be carried out when the number of the data units used for generating the detection data is not less than a predetermined value, and when the detection result judgment means judges that the detection data is invalid. The annunciation is made by, for example, a display, a voice, or the like.

With the arrangement, the user of the data storage medium reproducing device can recognize that an appropriate reproduction cannot be carried out due to some problems arisen from the data storage medium. As such, it is possible to avoid that the user misunderstands that such an appropriate reproduction cannot be carried out due to a defect or a wrong operation of the data storage medium reproducing device.

The data storage medium reproducing device may be arranged so that the reproduction signal is modulated in accordance with the recorded data, which is recorded on the data storage medium in a form of minute displacement of a pit or a mark.

In this case, generally, the modulation amount becomes minute. However, it becomes possible to generate the detection data having high accuracy by adjusting the total time length of the specific parts to be used for generating the detection data, in the integration means.

A method for reproducing a data storage medium, which stores recorded data, in accordance with the present invention, comprising the steps of: (a) reading out the data storage medium, and detecting a reproduction signal, which is modulated in accordance with recorded data; (b) generating detection data, which is an obtained detection result of the recorded data, by using one or more specific parts in the reproduction signal, and allowing accuracy of the detection data to be higher one, as a total time length of the specific parts to be used for generating the detection data becomes longer; and (c) controlling the total time length of the specific parts to be used, in the step (b), for generating valid detection data.

According to the method, by performing the step (a), the step (b), and the step (c), the same functions of the signal detection means, the data detection means, and the control means are realized, respectively. Therefore, the method of the present invention has the same effect as that of the data storage medium reproducing device of the present invention.

It is preferable that the method for reproducing a data storage medium is arranged so that the reproduction signal is modulated in accordance with repetition of data units that are made up of an identical bit pattern; the step (b) includes the steps of: (i) integrating a modulation amount of the reproduction signal with respect to the respective bits which correspond to each other in the data units, and (ii) generating the detection data in accordance with an integrated result, and the step (c) controlling the total time length in accordance with the number of the data units to be used for the integrating.

By thus integrating the modulation amount, the signal amount, that serves as a foundation for generating the detection data, can be increased. Further, by integrating the modulation amount, the variation in the modulation amount can be averaged, thereby improving SN ratio of the signal that serves as a foundation for generating the detection data.

On this account, even though the modulation amount is minute, it becomes possible to generate the detection data having relatively high accuracy. Further, it becomes possible to easily adjust the accuracy of the detection data in accordance with the total time length of the specific parts to be used for generating the detection data, i.e., in accordance with the number of the data units to be used for the integration.

It is preferable that the method for reproducing a data storage medium further includes the step of: (d) judging whether the detection data is valid or invalid, wherein: when the step (b) is carried out by using i-th data unit (i: natural number), and the detection data is judged to be invalid, the step (b) is carried out by using (i+1) data unit, while the current integration result is set as an initial value of a target integration. Note that, in the (d) step, the judgment is carried out by, for example, evaluating the signal quality of the reproducing signal as described above.

With the method, only thing to do is to increase, until the binary data generated in the step (a) is judged to be valid, the total number of the frames which are to be used for generating the binary data. This ensures that the valid binary data is generated in substantially the shortest time.

It is preferable that the method for reproducing a data storage medium further includes the step of: annunciating that an appropriate reproduction cannot be carried out when the judgment result obtained in the step (d) is still invalid after respectively carrying out said steps (b) and (d) by a predetermined number of times. The annunciation may be made by a display or a voice.

The method causes a user, who carries out the method for reproducing the data storage medium, to recognize that an appropriate reproduction cannot be carried out. As such, it is possible to avoid that the user misunderstands that such an appropriate reproduction cannot be carried out due to a defect or a wrong operation of the data storage medium reproducing device.

Note that it is possible to say that features of the data storage medium reproducing device of the present invention resides in the following points. Namely, a data storage medium reproducing device for reproducing a data storage medium in which data is recorded in accordance with a minute structure formed on the data storage medium includes: (i) integration means for integration a minute displacement amount; (ii) signal quality evaluation means for evaluating a signal quality of an output signal of the integration means; and (iii) data detection means for detecting the data from the output signal of the integration means, the data storage medium reproducing device controlling an output of the data detection means in accordance with an evaluation result of the signal quality evaluation means.

Further, the data storage medium reproducing device is intended to realize that the signal quality evaluation means evaluates in accordance with a result of an error correction processing carried out.

The data storage medium reproducing device further includes: a display means for displaying such a message when the signal quality is not more than a predetermined value after carrying out the integration processing in the integration means for predetermined number of times.

Note that it is possible to say that features of the method of the present invention for reproducing a data storage medium resides in the following points. Namely, a method, in accordance with the present invention, for reproducing a data storage medium in which data is recorded in accordance with minute structure formed on the data storage medium includes the steps of: (a) integrating a minute displacement amount; (b) evaluating a signal quality of an output signal of the integration means; and (c) controlling an output of the data detection means in accordance with an evaluation result of the signal quality evaluation means.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A data storage medium reproducing device for reproducing
    data recorded on a data storage medium, comprising:
    signal detection means for reading out the data storage medium, and for detecting a reproduction signal, which is modulated in accordance with recorded data, the reproduction signal being modulated according to repeating of sub data having the same content and being added to the recorded data;
    data detection means for (i) generating a valid detection data, which is an obtained detection result of the recorded data, by using one or more specific parts in the reproduction signal, and (ii) allowing an accuracy of the detection data to become higher as a total time length of accumulation of a modulation amount(s) of the one or more specific parts in the reproduction signal used for generating the detection data becomes longer; and
    control means for controlling the total time length of the accumulation of the modulation amount(s) of the one or more parts of the reproduction signal used by the data detection means for generating said valid detection data; and
    further comprising:
    signal quality evaluation means for evaluating a signal quality of the reproduction signal, wherein:
    the control means controls the total time length of the accumulation of the modulation amount(s) of the one or more parts in the reproduction signal in accordance with an evaluation result obtained by the signal quality evaluation means.

2. The data storage medium reproducing device as set forth in claim 1, wherein:
    the signal quality evaluation means evaluates in accordance with a result of an error correction processing carried out with respect to the detection data.

3. The data storage medium reproducing device as set forth in claim 1, further comprising:
    annunciation means for annunciating that an appropriate reproduction cannot be carried out when the total time length of the accumulation of the modulation amount(s) of the one or more specific parts in the reproduction signal is not less than a predetermined value, and when the evaluation result obtained by the signal quality evaluation means is poorer than a predetermined signal quality.

4. A data storage medium reproducing device for reproducing data recorded on a data storage medium, comprising:
    signal detection means for reading out the data storage medium, and for detecting a reproduction signal, which is modulated in accordance with recorded data, the reproduction signal being modulated according to repeating of sub data having the same content and being added to the recorded data;

data detection means for (i) generating a valid detection data, which is an obtained detection result of the recorded data, by using one or more specific parts in the reproduction signal, and (ii) allowing an accuracy of the detection data to become higher as a total time length of accumulation of a modulation amount(s) of the one or more specific parts in the reproduction signal used for generating the detection data becomes longer; and control means for controlling the total time length of the accumulation of the modulation amount(s) of the one or more parts of the reproduction signal used by the data detection means for generating said valid detection data wherein:

the reproduction signal is modulated in accordance with a repetition of data units that are made up of an identical bit pattern; and said data detection means accumulates the modulation amount(s) of the reproduction signal with respect to the respective bits which correspond to each other in the data units, and generates a corresponding bit of the detection data in accordance with an accumulation result corresponding to each of the bits, and the control means controls said total time length of the accumulation of the modulation amount(s) of the one or more specific parts of the reproduction signal in accordance with a number of the data units to be used by said data detection means for said accumulation, and wherein said control means judges whether the detection data is valid or invalid, while the number of the data units to be used for said accumulation is incremented one by one up to a predetermined upper limit, said signal detection means and said control means respectively repeat generation of the detection data and the judgment whether the detection data is valid or invalid; and when said control means judges, before the number of the data units reaches the upper limit, that the detection data generated by said signal detection means is valid, said control means outputs the detection data.

5. The data storage medium reproducing device as set forth in claim 4, wherein:

the control means judges whether the detection data is valid or invalid in accordance with a result of an error correction processing carried out with respect to the detection data.

6. The data storage medium reproducing device as set forth in claim 4, wherein:

the control means judges whether the detection data is valid or invalid in accordance with a variation in the accumulation results that correspond to the respective bits.

7. The data storage medium reproducing device as set forth in claim 1 or 4, further comprising:

annunciation means for annunciating that an appropriate reproduction cannot be carried out when the number of the data units used for generating the detection data is not less than a predetermined value, and when said control means judges that the detection data is invalid.

8. A method for reproducing a data storage medium, which stores recorded data, comprising the steps of:

(a) reading out the data storage medium, and detecting a reproduction signal, which is modulated in accordance with recorded data, the reproduction signal being modulated according to repeating of sub data having the same content and being added to the recorded data;

(b) generating a valid detection data, which is an obtained detection result of the recorded data, by using one or more specific parts in the reproduction signal, and allowing an accuracy of the detection data to become higher as a total time length of accumulation of a modulation amount(s) of the one or more specific parts in the reproduction signal used for generating the detection data becomes longer; and (c) controlling the total time length of the accumulation of the modulation amount(s) of the one or more specific parts in the reproduction signal used in the step (b) for generating said valid detection data, wherein:

the reproduction signal is modulated in accordance with repetition of data units that are made up of an identical bit pattern;

the step (b) includes the steps of:

(i) accumulating the modulation amount(s) of the reproduction signal with respect to the respective bits which correspond to each other in the data units, and (ii) generating the detection data in accordance with an accumulation result, and the step (c) controls the total time length of the accumulation of the modulation amount(s) of the one or more specific parts in the reproduction signal in accordance with the number of the data units used in said accumulation, further comprising the step of:

(d) judging whether the detection data is valid or invalid, wherein the step (a) and the step (b) are repeated while incrementing one by one up to a predetermined upper limit the number of data units to be used for said accumulation; and when it is judged in the step (d), before the number of the data units reaches the upper limit, that the detection data generated in step (b) is valid, in step (c), the detection data is outputted.

9. The method for reproducing a data storage medium as set forth in claim 8, further comprising the step of:

annunciating that an appropriate reproduction cannot be carried out when the judgment result obtained in the step (d) remains invalid after respectively carrying out said steps (b)-(d) a predetermined number of times.

* * * * *